(12) United States Patent
Groves et al.

(10) Patent No.: US 10,715,007 B2
(45) Date of Patent: *Jul. 14, 2020

(54) DEVICES AND METHODS FOR INCREASING ENERGY AND/OR POWER DENSITY IN COMPOSITE FLYWHEEL ENERGY STORAGE SYSTEMS

(71) Applicant: MANAGEMENT SERVICES GROUP, INC., Virginia Beach, VA (US)

(72) Inventors: Scott Eric Groves, Brentwood, CA (US); Stanley K. Ault, Cinebar, WA (US)

(73) Assignee: Management Services Group, Inc., Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,197

(22) Filed: Jul. 20, 2018

(65) Prior Publication Data
US 2018/0337576 A1 Nov. 22, 2018

Related U.S. Application Data

(63) Continuation of application No. 15/610,003, filed on May 31, 2017, now Pat. No. 10,050,491, which is a
(Continued)

(51) Int. Cl.
*H02K 7/02* (2006.01)
*F16F 15/30* (2006.01)
(Continued)

(52) U.S. Cl.
CPC ........... *H02K 7/025* (2013.01); *F16F 15/305* (2013.01); *H02J 3/30* (2013.01); *H02K 2213/03* (2013.01); *Y02E 60/16* (2013.01)

(58) Field of Classification Search
CPC ...... H02K 7/02; H02K 7/025; H02K 2213/03; F16F 15/18; F16F 15/30; F16F 15/305;
(Continued)

(56) References Cited

U.S. PATENT DOCUMENTS 2,857,094 A 10/1958 Erwin
3,602,066 A 8/1971 Wetherbee
(Continued)

FOREIGN PATENT DOCUMENTS

CN 1719692 A 1/2006
CN 103438152 B 8/2015
(Continued)

OTHER PUBLICATIONS

International Search Report and Written Opinion for International Patent Application No. PCT/US2015/063165, dated Apr. 11, 2016.
(Continued)

*Primary Examiner* — Adam D Rogers
(74) *Attorney, Agent, or Firm* — Cooley LLP

(57) ABSTRACT

A flywheel formed of a composite material having fibers, oriented substantially in a circumferential direction around the flywheel, embedded in a matrix material. The flywheel having an inner surface, an outer surface, and a thickness therebetween and defining an axis of rotation. A plurality of load masses are distributed circumferentially on the inner surface at a longitudinal segment along the axis. A rotation of the flywheel about the axis with a rotational velocity generating hoop stress in the fibers in the circumferential direction and through-thickness stress is generated in the matrix material in a radial direction. Each load mass produces a force on the inner surface operative to reduce the maximum through-thickness stress in the matrix material as the flywheel rotates about the axis. The rotational velocity otherwise sufficient to produce structural failure of the
(Continued)

matrix material produces structural failure of the fibers and not the matrix material.

13 Claims, 13 Drawing Sheets

Related U.S. Application Data continuation of application No. PCT/US2015/063165, filed on Dec. 1, 2015, which is a continuation-in-part of application No. 14/564,982, filed on Dec. 9, 2014, now abandoned, and a continuation-in-part of application No. 14/557,752, filed on Dec. 2, 2014, now abandoned.

(51) Int. Cl.
*H02J 3/30* (2006.01)
*F16F 15/305* (2006.01)

(58) Field of Classification Search
CPC .. F16F 15/31; H02J 3/30; Y02E 60/16; Y10T 74/2117; Y10T 74/212; B60K 6/10; B60K 6/105
See application file for complete search history.

(56) References Cited

U.S. PATENT DOCUMENTS

| | | |
|---|---|---|
| 3,683,216 A | 8/1972 | Post |
| 3,698,262 A | 10/1972 | Rabenhorst |
| 3,737,694 A | 6/1973 | Rabenhorst |
| 3,741,034 A | 6/1973 | Post |
| 3,788,162 A | 1/1974 | Rabenhorst et al. |
| 3,859,868 A | 1/1975 | Post |
| 3,964,341 A | 6/1976 | Rabenhorst |
| 4,000,665 A | 1/1977 | Rabenhorst |
| 4,028,962 A | 6/1977 | Nelson |
| 4,036,080 A | 7/1977 | Friedericy et al. |
| 4,052,913 A | 10/1977 | Schultz et al. |
| 4,080,845 A | 3/1978 | Hatch |
| 4,098,142 A | 7/1978 | Weyler |
| 4,123,949 A | 11/1978 | Knight et al. |
| 4,176,563 A | 12/1979 | Younger |
| 4,186,245 A | 1/1980 | Gilman |
| 4,186,623 A | 2/1980 | Friedericy et al. |
| 4,187,738 A | 2/1980 | Knight et al. |
| 4,198,878 A | 4/1980 | Gupta et al. |
| 4,266,442 A | 5/1981 | Zorzi |
| 4,285,251 A | 8/1981 | Swartout |
| 4,341,001 A | 7/1982 | Swartout |
| 4,370,899 A | 2/1983 | Swartout |
| 4,408,500 A | 10/1983 | Kulkarni et al. |
| 4,413,860 A | 11/1983 | Prescott |
| 4,458,400 A | 7/1984 | Friedericy et al. |
| 4,481,840 A | 11/1984 | Friedericy et al. |
| 4,502,349 A | 3/1985 | Abiven et al. |
| 4,569,114 A | 2/1986 | Ashcombe et al. |
| 4,660,435 A | 4/1987 | Davis et al. |
| 4,697,324 A | 10/1987 | Grant et al. |
| 4,765,198 A | 8/1988 | Stravrinidis |
| 4,821,599 A | 4/1989 | Medlicott |
| 4,850,244 A | 7/1989 | Eckel et al. |
| 4,870,310 A | 9/1989 | Triplett |
| 4,996,016 A | 2/1991 | Walls et al. |
| 5,012,694 A | 5/1991 | McGrath |
| 5,015,940 A | 5/1991 | Lois |
| 5,124,605 A | 6/1992 | Bitterly et al. |
| 5,268,608 A | 2/1993 | Bitterly et al. |
| 5,214,981 A | 6/1993 | Weinberger et al. |
| 5,285,699 A | 2/1994 | Walls et al. |
| 5,398,571 A | 3/1995 | Lewis |
| 5,452,625 A | 9/1995 | Nardone et al. |
| 5,466,977 A | 11/1995 | Bitterly et al. |
| 5,495,221 A | 2/1996 | Post |
| 5,566,588 A | 10/1996 | Bakholdin et al. |
| 5,586,471 A | 12/1996 | Nardone et al. |
| 5,590,569 A | 1/1997 | Nardone et al. |
| 5,614,777 A | 3/1997 | Bitterly et al. |
| 5,628,232 A | 5/1997 | Bakholdin et al. |
| 5,637,939 A | 6/1997 | Serdar et al. |
| 5,667,171 A | 9/1997 | Fowell et al. |
| 5,692,414 A | 12/1997 | Gregoire |
| 5,695,584 A | 12/1997 | Gregoire |
| 5,696,414 A | 12/1997 | Serdar et al. |
| 5,705,902 A | 1/1998 | Merritt et al. |
| 5,717,263 A | 2/1998 | Cox |
| 5,721,459 A | 2/1998 | Rao et al. |
| 5,722,303 A | 3/1998 | Hull et al. |
| 5,729,903 A | 3/1998 | Bitterly et al. |
| 5,732,603 A | 3/1998 | Swett et al. |
| 5,758,549 A | 6/1998 | Deteresa et al. |
| 5,760,506 A | 6/1998 | Ahlstrom et al. |
| 5,767,595 A | 6/1998 | Rosen |
| 5,775,176 A | 7/1998 | Bender et al. |
| 5,778,735 A | 7/1998 | Groves et al. |
| 5,778,736 A | 7/1998 | Maass et al. |
| 5,783,883 A | 7/1998 | Serdar et al. |
| 5,784,926 A | 7/1998 | Maass |
| 5,784,927 A | 7/1998 | Rao et al. |
| 5,811,900 A | 9/1998 | Serdar et al. |
| 5,815,907 A | 10/1998 | Gunsallus et al. |
| 5,816,114 A | 10/1998 | Gregoire et al. |
| 5,821,650 A | 10/1998 | Gunsallus et al. |
| 5,847,480 A | 12/1998 | Post |
| 5,855,055 A | 1/1999 | Boudreau et al. |
| 5,905,321 A | 5/1999 | Clifton et al. |
| 5,924,335 A | 7/1999 | Kuklo |
| 5,941,132 A | 8/1999 | Kuklo |
| 5,962,941 A | 10/1999 | Serdar et al. |
| 5,969,446 A | 10/1999 | Eisenhaure et al. |
| 5,969,457 A | 10/1999 | Clifton et al. |
| 5,998,899 A | 12/1999 | Rosen et al. |
| 6,014,911 A | 1/2000 | Swett |
| 6,029,350 A | 2/2000 | Maass et al. |
| 6,044,726 A | 4/2000 | Blake |
| 6,069,424 A | 5/2000 | Colello et al. |
| 6,111,332 A | 8/2000 | Post |
| 6,118,202 A | 9/2000 | Pinkerton |
| 6,122,993 A | 9/2000 | Morris et al. |
| 6,138,527 A | 10/2000 | Bitterly et al. |
| 6,160,336 A | 12/2000 | Baker et al. |
| 6,175,172 B1 | 1/2001 | Bakholdin et al. |
| 6,211,589 B1 | 4/2001 | Ahlstrom et al. |
| 6,247,382 B1 | 6/2001 | Umeki et al. |
| 6,388,347 B1 | 5/2002 | Blake et al. |
| 6,396,186 B1 | 5/2002 | Post |
| 6,486,627 B1 | 11/2002 | Gabrys |
| 6,508,145 B1 | 1/2003 | Gabrys |
| 6,566,775 B1 | 5/2003 | Fradella |
| 6,583,528 B2 | 6/2003 | Gabrys |
| 6,609,674 B2 | 8/2003 | Gabrys |
| 6,614,132 B2 | 9/2003 | Hockney et al. |
| 6,624,542 B1 | 9/2003 | Gabrys et al. |
| 6,630,761 B1 | 10/2003 | Gabrys |
| 6,664,680 B1 | 12/2003 | Gabrys |
| 6,688,191 B2 | 2/2004 | Canders |
| 6,710,489 B1 | 3/2004 | Gabrys |
| 6,794,777 B1 | 9/2004 | Fradella |
| 6,806,605 B1 | 10/2004 | Gabrys |
| 6,817,266 B1 | 11/2004 | Brackett |
| 6,819,012 B1 | 11/2004 | Gabrys |
| 6,824,861 B2 | 11/2004 | Spears |
| 6,825,588 B2 | 11/2004 | Gabrys et al. |
| 6,852,401 B2 | 2/2005 | Spears et al. |
| 6,867,520 B2 | 3/2005 | Jennings |
| 6,868,753 B2 | 3/2005 | Tsai |
| 6,873,235 B2 | 3/2005 | Fiske et al. |
| 6,897,587 B1 | 5/2005 | McMullen et al. |
| 6,906,446 B2 | 6/2005 | Post |
| 6,959,756 B2 | 11/2005 | Woodard et al. |
| 6,987,339 B2 | 1/2006 | Adams et al. |
| 6,995,529 B2 | 2/2006 | Sibley |

(56) References Cited

U.S. PATENT DOCUMENTS

| | | | |
|---|---|---|---|
| 7,053,589 | B2 | 5/2006 | Gabrys et al. |
| 7,071,581 | B2 | 7/2006 | Eisenhaure et al. |
| 7,080,573 | B2 | 7/2006 | Detore et al. |
| 7,187,087 | B2 | 3/2007 | Khalizadeh |
| 7,263,912 | B1 | 9/2007 | Gabrys et al. |
| 7,267,028 | B2 | 9/2007 | Gabrys |
| 7,830,055 | B2 | 11/2010 | Arseneaux et al. |
| 7,834,479 | B2 | 11/2010 | Capp et al. |
| 7,876,010 | B2 | 1/2011 | Post |
| 8,053,940 | B2 | 11/2011 | McCulley |
| 8,154,148 | B2 | 4/2012 | Langlois et al. |
| 8,234,953 | B2 | 8/2012 | Hilton et al. |
| 8,242,649 | B2 | 8/2012 | Fradella |
| 8,264,121 | B2 | 9/2012 | Post |
| 8,584,552 | B2 | 11/2013 | Gottfried |
| 8,593,012 | B2 | 11/2013 | Peitzke et al. |
| 8,601,895 | B2 | 12/2013 | Serkh et al. |
| 8,643,249 | B2 | 2/2014 | Post |
| 8,664,815 | B2 | 3/2014 | Ishikawa et al. |
| 8,698,365 | B2 | 4/2014 | Hull et al. |
| 8,707,821 | B2 | 4/2014 | Dugas |
| 8,723,358 | B2 | 5/2014 | McMullen |
| 8,760,021 | B2 | 6/2014 | Post |
| 8,776,635 | B2 | 7/2014 | Morgan et al. |
| 8,791,613 | B2 | 7/2014 | Wang |
| 8,803,363 | B2 | 8/2014 | Veltri |
| 8,823,233 | B2 | 9/2014 | Post |
| 8,826,771 | B2 | 9/2014 | Wiklof |
| 9,362,800 | B2 | 6/2016 | Chiao et al. |
| 9,548,636 | B2 | 1/2017 | Kalev |
| 10,050,491 | B2 * | 8/2018 | Groves .................. H02K 7/025 |
| 2003/0094873 | A1 | 5/2003 | Kim et al. |
| 2003/0101844 | A1 | 6/2003 | Gabrys |
| 2004/0046471 | A1 | 3/2004 | Kim et al. |
| 2004/0076809 | A1 | 4/2004 | Spears |
| 2005/0150323 | A1 | 7/2005 | Spears |
| 2005/0155450 | A1 | 7/2005 | Jennings |
| 2005/0206262 | A1 | 9/2005 | Kim et al. |
| 2006/0053959 | A1 | 3/2006 | Park et al. |
| 2006/0186751 | A1 | 8/2006 | Kim et al. |
| 2007/0014980 | A1 | 1/2007 | Spears |
| 2010/0018344 | A1 | 1/2010 | Spears et al. |
| 2010/0206126 | A1 | 8/2010 | Spears et al. |
| 2011/0023636 | A1 | 2/2011 | Atkins et al. |
| 2012/0062154 | A1 | 3/2012 | Chiao et al. |
| 2012/0096983 | A1 | 4/2012 | Pinneo et al. |
| 2012/0198960 | A1 | 8/2012 | Dubois et al. |
| 2013/0002071 | A1 | 1/2013 | Van Dam et al. |
| 2013/0033136 | A1 | 2/2013 | McMullen |
| 2013/0205943 | A1 | 8/2013 | Ha |
| 2014/0216204 | A1 | 8/2014 | Christensen et al. |
| 2014/0366683 | A1 | 12/2014 | Pullen |
| 2015/0007686 | A1 | 1/2015 | Dharan |
| 2015/0008778 | A1 | 1/2015 | Dharan |
| 2015/0013148 | A1 | 1/2015 | Dharan |

FOREIGN PATENT DOCUMENTS

| | | |
|---|---|---|
| DE | 102013208856 | 11/2014 |
| JP | S61-164442 A | 7/1986 |
| JP | H09-053234 A | 2/1997 |
| JP | H10-512436 T | 11/1998 |
| JP | H11-168852 A | 6/1999 |
| JP | 2000-24478 A | 1/2000 |
| JP | 2002-95209 A | 3/2002 |
| JP | 2013-213584 A | 10/2013 |
| JP | 2013-215083 A | 10/2013 |
| WO | WO 2016/089855 A1 | 6/2016 |

OTHER PUBLICATIONS

Office Action for U.S. Appl. No. 14/557,752, dated Feb. 29, 2016, 12 pages.
DeTeresa, S. J. et al., "Matrix Dominated Performance of Thick-Section Fiber Composites for Flywheel Applications," U.S. Department of Energy, Office of Scientific and Technical Information (Jan. 2001), 14 pages.
Sharma, A. and Bakis, C.E. (2003). Radial Tensile Test Method for Thick Composite Rings, In: Proceedings of the Annual Conference and Exposition on Experimental and Applied Mechanics, Charlotte, NC, Jun. 2-4, 2003, Society for Experimental Mechanics, Bethel, CT, Paper No. 296.
Composite Flywheels: Finally Picking Up Speed?: Composites World, [retrieved from the Internet] [retrieved on Mar. 3, 2015 at URL: http://www.compositesworld.com/blog/post/composite-flywheels-finally-picking-up-speed].
Non-Final Office Action issued in the United States Patent and Trademark Office for U.S. Appl. No. 15/610,003 dated Feb. 16, 2018.
Extended European Search Report issued in the European Patent Office for Application No. EP15865035.8 dated Jun. 6, 2018, 11 pages.
Extended European Search Report for European Application No. 15865035.8, dated Jun. 6, 2018, 11 pages.
First Office Action for Chinese Patent Application No. 201580075128.7, dated Dec. 11, 2018, 12 pages including English translation.
First Examination Report issued by the Australian Patent Office for Application No. 2015355119, dated May 10, 2019, 5 pages.
Office Action for Chinese Patent Application No. 201580075128.7, dated Aug. 9, 2019, 3 pages, Non-English.
Office Action issued by the Japanese Patent Office for Application No. 2017-530202, dated Oct. 25, 2019, 15 pages including English translation.

* cited by examiner

DEVICES AND METHODS FOR INCREASING ENERGY AND/OR POWER DENSITY IN COMPOSITE FLYWHEEL ENERGY STORAGE SYSTEMS

CROSS-REFERENCE TO RELATED APPLICATIONS

This application is a continuation of U.S. patent application Ser. No. 15/610,003, filed May 31, 2017, which is continuation of International Patent Application No. PCT/US2015/063165 entitled "Devices and Methods for Increasing Energy and/or Power Density in Composite Flywheel Energy Storage Systems," filed Dec. 1, 2015, the disclosure of which is incorporated herein by reference in its entirety.

PCT/US2015/063165 is a continuation-in-part of U.S. patent application Ser. No. 14/557,752, entitled "High Energy Density Composite Flywheels/Electromechanical Batteries," filed Dec. 2, 2014, the disclosure of which is incorporated herein by reference in its entirety.

PCT/US2015/063165 is also a continuation-in-part of U.S. patent application Ser. No. 14/564,982, entitled "High Power Density Electromechanical Energy Storage Flywheel," filed Dec. 9, 2014, the disclosure of which is incorporated herein by reference in its entirety.

BACKGROUND

Some embodiments described herein relate to electromagnetic machines and more particularly to devices and methods for increasing energy and/or power density in composite flywheel energy storage systems.

Electromechanical flywheel devices can be used for large capacity energy storage to improve, for example, the economic performance and stability of utility, industrial, military, and/or other suitable grid infrastructures. Such flywheel devices are mechanical—storing energy via rotational kinetic energy and delivering energy back to the grid or local energized component via a motor/generator system at least electrically connected to the flywheel device. The application of some known flywheel energy storage systems, however, can be limited based at least in part on physical limitations associated with a mechanical system (e.g., high forces associated with rotational velocities and acceleration, which can lead to failure of component materials and/or catastrophic system failure and/or the like).

For example, it is usually desirable to maximize the energy density (energy per unit mass, W-h/kg). The kinetic energy associated with the flywheel can be increased (e.g., added or inserted) by application of electrical energy, or decreased by extraction of electrical energy, via a motor-generator that is operably coupled to and/or otherwise included in the primary energy storage portion of the device. One way to increase energy per unit mass of a flywheel is to form the flywheel, at least in part, from high-strength, low density composite material (e.g., carbon fiber. Because carbon fiber has a higher tensile strength per unit mass than other materials (such as glass fiber or steel), a flywheel formed from carbon fiber can rotate at a relatively higher rotational velocity (due to higher tensile strength to resist circumferential stresses) for a given amount of mass, thus increasing the rotational kinetic energy for that amount of mass, i.e. density per unit mass. However, composite materials, such as those formed from carbon fiber, have much lower strength in the radial direction than in the circumferential direction because radial stresses are carried by the composite's matrix material, e.g. a polymer resin. The matrix material has much lower tensile strength than the fiber material (e.g. carbon fiber). Thus, the rotational velocities of flywheels formed of carbon fiber are limited by the strength of the matrix, rather than the strength of the carbon fiber.

Thus, a need exists for devices and methods for changing the relationship between radial and circumferential stresses in flywheels formed of high-strength composite materials to enable increased energy and/or power density of the flywheel.

SUMMARY

Apparatus and methods for force distribution in composite flywheel energy storage systems are described herein. In some embodiments, an apparatus includes a hollow cylindrical flywheel for a motor/generator. The flywheel is formed of a composite material including a matrix material and fibers oriented at least in part in a circumferential direction around the flywheel and embedded in the matrix material. The flywheel has a radially inner surface, a radially outer surface, and a radial thickness between the radially inner surface and the radially outer surface. The flywheel is configured to rotate about a longitudinal axis defined by the flywheel. The rotation of the flywheel generates hoop stress in the fibers in the circumferential direction and through-thickness stress in the matrix material in the radial direction. The material properties of the fibers and the matrix material are such that rotation of the flywheel about the longitudinal axis at a first rotational velocity sufficiently high to produce structural failure of the flywheel produces failure of the matrix material in the radial direction and not failure of the fibers in the circumferential direction. The apparatus further includes a plurality of load masses distributed circumferentially around, and coupled to, the radially inner surface of the flywheel at a longitudinal segment along the longitudinal axis such that rotation of the flywheel results in each load mass from the plurality of load masses producing a force in a radially outward direction on the radially inner surface. The force acts to reduce the maximum through-thickness stress in the matrix material such that a second rotational velocity, greater than the first rotational velocity, sufficiently high to produce structural failure of the flywheel in the longitudinal segment, produces failure of the fibers in the circumferential direction and not failure of the matrix material in the radial direction.

DETAILED DESCRIPTION

Figure 1:
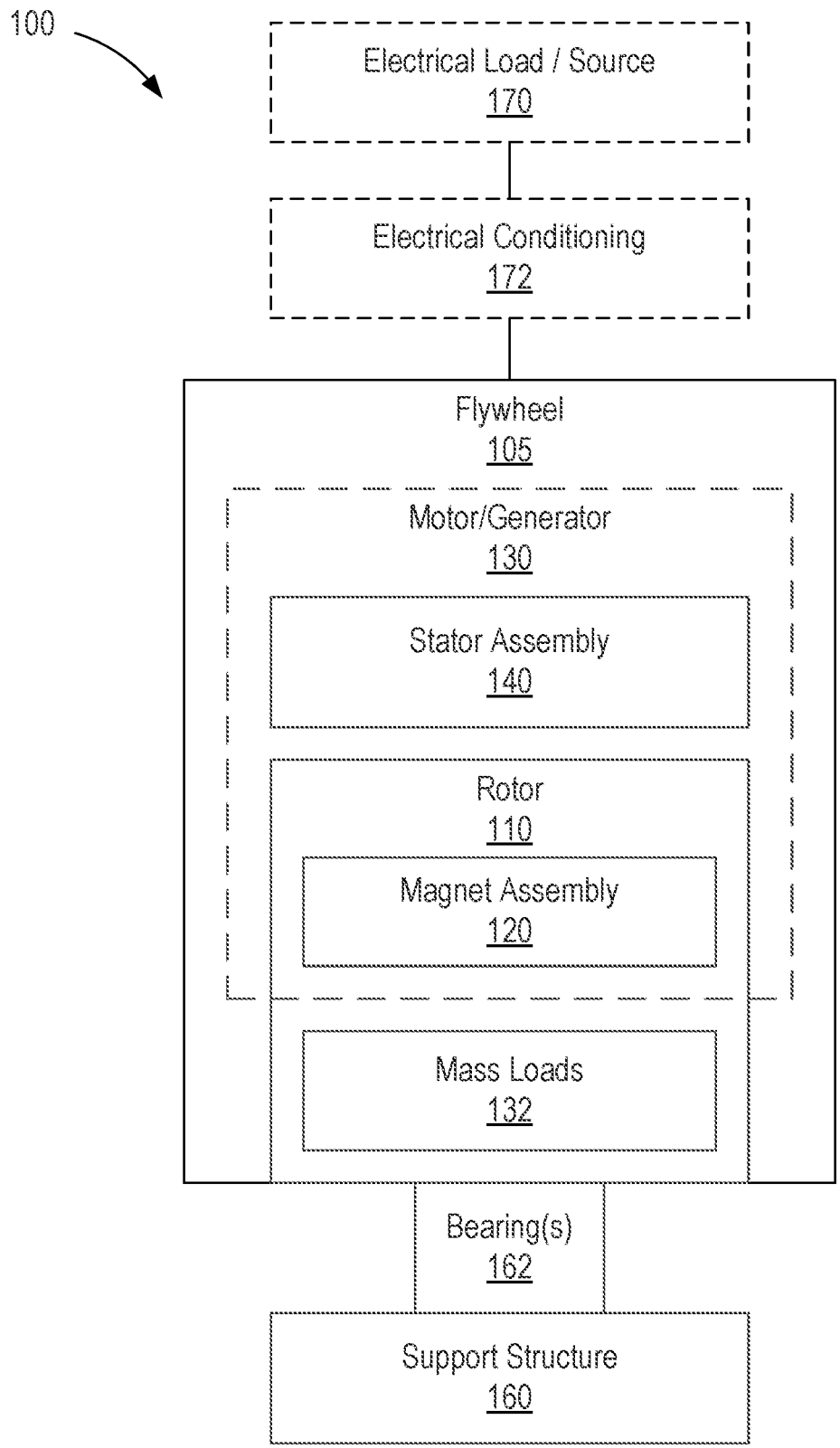
FIG. 1 is a schematic illustration of an electromagnetic machine structure according to an embodiment.

In some embodiments, an apparatus includes a hollow cylindrical flywheel for a motor/generator. The flywheel is formed of a composite material including a matrix material and fibers oriented at least in part in a circumferential direction around the flywheel embedded in the matrix material. The flywheel has a radially inner surface, a radially outer surface, and a radial thickness between the radially inner surface and the radially outer surface. The flywheel is configured to rotate about a longitudinal axis defined by the flywheel. The rotation of the flywheel generates hoop stress in the fibers in the circumferential direction and through-thickness stress in the matrix material in the radial direction. The material properties of the fibers and the matrix material are such that rotation of the flywheel about the longitudinal axis at a first rotational velocity sufficiently high to produce structural failure of the flywheel produces failure of the matrix material in the radial direction and not failure of the fibers in the circumferential direction. The apparatus further includes a plurality of load masses distributed circumferentially around, and coupled to, the radially inner surface of the flywheel at a longitudinal segment along the longitudinal axis such that rotation of the flywheel results in each load mass from the plurality of load masses producing a force in a radially outward direction on the radially inner surface. The force acts to reduce the maximum through-thickness stress in the matrix material such that a second rotational velocity, greater than the first rotational velocity and sufficiently high to produce structural failure of the flywheel in the longitudinal segment, produces failure of the fibers in the circumferential direction and not failure of the matrix material in the radial direction.

In some embodiments, an apparatus includes a rotor configured to be disposed within a flywheel energy storage device. The rotor is formed of a composite material including a matrix material and fibers oriented at least in part in a circumferential direction around the rotor embedded in the matrix material. The rotor has a longitudinal axis of rotation and a radially inner surface. The rotor is configured to rotate about the longitudinal axis relative to a stator. A first plurality of load masses and a second plurality of load masses are coupled to the inner surface of the rotor. Each load mass from the first plurality of load masses has a first density and a first size. A first portion of the first plurality of load masses is distributed along the inner surface in the circumferential direction at a first longitudinal segment along the axis of rotation, and a second portion of the first plurality of load masses is distributed along the inner surface in the circumferential direction at a second longitudinal segment along the axis of rotation. Each load mass from the second plurality of load masses has a second density greater than the first density and a second size less than the first size. The second plurality of load masses is distributed along the inner surface in a circumferential direction at a third longitudinal segment along the axis of rotation between the first longitudinal segment and the second longitudinal segment. The first plurality of load masses and the second plurality of load masses cover the inner surface such that a substantially uniform pressure is exerted on the inner surface of the rotor when the rotor is rotated about the longitudinal axis relative to the stator.

In some embodiments, an apparatus includes a rotor configured to be disposed within a flywheel energy storage device, a stator, and a plurality of load masses. The rotor is formed of a composite material including a matrix material and fibers oriented at least in part in a circumferential direction around the rotor embedded in the matrix material. The rotor includes a first plurality of magnets distributed along an inner surface of the rotor in the circumferential direction at a first longitudinal segment along an axis of rotation defined by the rotor. The rotor includes a second plurality of magnets distributed along the inner surface in the circumferential direction at a second longitudinal segment along the axis of rotation. The first plurality of magnets and the second plurality of magnets define a space therebetween. The stator is disposed within the rotor such that a portion of the stator is within the space defined between the first plurality of magnets and the second plurality of magnets. A plurality of load masses are formed of a nonmagnetic material and are distributed along the inner surface in the circumferential direction and within the space defined between the first plurality of magnets and the second plurality of magnets such that the plurality of load masses is between the inner surface of the rotor and a circumferential surface of the portion of the stator. The first plurality of magnets, the second plurality of magnets, and the plurality of load masses collectively exert a substantially uniform pressure on the inner surface of the rotor operative in reducing a radial stress within the rotor when the rotor is rotated about the longitudinal axis.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the term "substantially" when used in connection with a geometric relationship and/or characteristic (e.g., "cylindrical," "linear," "parallel," "perpendicular," etc.) is intended to convey that the structure so defined is nominally the geometric relationship and/or characteristic so defined. As one example, a portion of a surface of a component that is described as being "substantially linear" is intended to convey that, although linearity of the surface is desirable, some non-linearity can occur in the "substantially linear" surface. Such non-linearity can result from manufacturing tolerances, or other practical considerations (such as, for example, forces acting thereon). Thus, a geometric construction modified by the term "substantially" includes such geometric properties within a tolerance of, for example, plus or minus 5% of the stated geometric construction unless otherwise explicitly stated. For example, a "substantially linear" surface is a surface that defines a plane or an axis along a plane that is within plus or minus 5% of being linear.

As used herein, the term "axial direction" can refer to, for example, a direction extending parallel to an axis of rotation of a component of an electromagnetic machine. For example, in a motor/generator having a rotor that is rotatably movable relative to a stator, a force can be said to be in the axial direction when the force vector is substantially parallel a direction along an axis of rotation of the rotor.

As used herein, the term "rotational direction," and/or "circumferential direction" can refer to, for example, a direction extending along a surface of a component having a fixed radius and in a direction of rotation of the component (e.g., a component of a rotor included in a motor/generator). In considering, for example, a relatively small portion of a component and/or a point along a surface of the component, a rotational direction can be considered a "tangential direction."

As used herein, the term "radial direction" can refer to, for example, a direction extending, at a constant axial position, from an axis of rotation of a component, for example, to an outer surface of that component. For example, a force can be said to be in the radial direction when the force vector extends from an axis of rotation of a rotor toward an outer surface of the rotor with a substantially fixed axial position.

As used herein, the terms "tensile strength" and "shear strength" refer to a materials ability to resist breaking under an applied force. More specifically, the term "tensile strength" refers to a material's ability to resist breaking when subjected to a tensile or compressive force. For example, a material can be exposed to a tensile force when a first portion of the material is pulled relative to a second portion of the material. The term "shear strength" refers to a material's ability to resist breaking when subjected to a shear force. For example, the material can be exposed to a shear force when the first portion of the material is pulled apart from the second portion of the material in a planar direction (e.g., along a plane defined by the portion and the second portion).

As used herein, the term "tension" is related to the internal forces (i.e., stress) within an object in response to an external force pulling the object in an axial direction. For example, an object with a mass being hung from a rope at one end and fixedly attached to a support at the other end exerts a force to place the rope in tension. The stress within an object in tension can be characterized in terms of the cross-sectional area of the object. For example, less stress is applied to an object having a cross-sectional area greater than another object having a smaller cross-sectional area. The maximum stress exerted on an object in tension prior to plastic deformation (e.g., permanent deformation such as, for example, necking and/or the like) is characterized by the object's tensile strength. The tensile strength is an intensive property of (i.e., is intrinsic to) the constituent material. Thus, the maximum amount of stress of an object in tension can be increased or decreased by forming the object from a material with a greater tensile strength or lesser tensile strength, respectively.

As used herein, the term "stiffness" is related to an object's resistance to deflection, deformation, and/or displacement that is produced by an applied force, and is generally understood to be the opposite of the object's "flexibility." For example, a material with a greater stiffness is more resistant to deflection, deformation, and/or displacement when exposed to a force than a material having a lower stiffness. Similarly stated, an object having a higher stiffness can be characterized as being more rigid than an object having a lower stiffness. Stiffness can be characterized in terms of the amount of force applied to the object and the resulting distance through which a first portion of the object deflects, deforms, and/or displaces with respect to a second portion of the object. When characterizing the stiffness of an object, the deflected distance may be measured as the deflection of a portion of the object different from the portion of the object to which the force is directly applied. Said another way, in some objects, the point of deflection is distinct from the point where force is applied.

Stiffness (and therefore, flexibility) is an extensive property of the object being described, and thus is dependent upon the material from which the object is formed as well as certain physical characteristics of the object (e.g., cross-sectional shape, length, boundary conditions, etc.). For example, the stiffness of an object can be increased or decreased by selectively including in the object a material having a desired modulus of elasticity, flexural modulus, and/or hardness. The modulus of elasticity is an intensive property of (i.e., is intrinsic to) the constituent material and describes an object's tendency to elastically (i.e., non-permanently) deform in response to an applied force. A material having a high modulus of elasticity will not deflect as much as a material having a low modulus of elasticity in the presence of an equally applied stress. Thus, the stiffness of the object can be increased, for example, by introducing into the object and/or constructing the object of a material having a relatively high modulus of elasticity. As described in further detail herein, composite materials (e.g., materials formed from two or more constituent materials having different physical or chemical properties) such as carbon fiber composites generally increase the stiffness of a substrate material (e.g., plastic resin or glass) in a direction parallel to the direction of the carbon fibers.

Electromagnetic machines as described herein can be any suitable type or machine used, for example, as an energy storage device, a motor, a generator, and/or the like. By way of example, although some of the embodiments are described herein with reference to use within an electromagnetic machine such as a flywheel or the like, it should be understood that the embodiments described herein can also be used within other machines or mechanisms. Furthermore, while the embodiments are described herein as being implemented in or on a flywheel including an integrated motor/generator, it should be understood that the embodiments described herein can be implemented in or on a flywheel that is operably coupled to a motor/generator and/or any other suitable electric, electromechanical, and/or electromagnetic device. While the motor/generators and/or other electromagnetic machines described herein are generally permanent magnet electromagnetic machines such as axial flux machines and/or radial flux machines, the embodiments and/or components thereof can be implemented in any suitable type of machine.

The embodiments described herein can be implemented in or on an electromechanical flywheel configured to store energy in the form of rotational kinetic energy. For example, energy (e.g., electric energy, mechanical energy, and/or the like) can be supplied to the flywheel, which results in rotation of a rotating mass (e.g., a rotor) about an axis. Thus, the flywheel can store at least a portion of the energy supplied thereto. Conversely, energy can be discharged from the flywheel by reducing a rotational velocity of the rotor, for example, by inducing an electric current in the windings of a motor/generator, which in turn, delivers the electric current to a load.

Generally, it is desirable to increase the energy density (W-h/kg) associated with the flywheel while maintaining safe operating conditions. Thus, in some instances, it is desirable to form rotating components of the flywheel (e.g., a rotor) from relatively lightweight and/or low-density materials. The stored rotational energy for a given system is represented by Equation 1 below:

$$E = \frac{1}{2}I\omega^2 \qquad \text{Equation 1}$$

where E is energy, I is the mass moment of inertia, and $\omega$ is the rotational velocity.

Thus, a flywheel energy storage device stores more energy as the mass moment of inertia I of the rotating parts and the rotational velocity $\omega$ is increased. The mass moment of inertia I for each individual component that is rotating is represented by Equation 2 below:

$$I = \frac{1}{2}m(r_o^2 + r_i^2) \qquad \text{Equation 2}$$

where m is the rotating mass, $r_o$ and $r_i$ are the outer radius and inner radius, respectively, of the locations of each individual mass component.

Thus, the farther away a rotating mass is from its rotational axis, the larger the mass moment of inertia and the higher the stored rotational energy for a given rotational velocity. While the energy stored by a flywheel is increased as the rotational velocity and size of the rotating parts are increased, increasing the rotational velocity increases the stresses within the constituent material. Specifically, rotational components of a flywheel are subject to circumferential tensile stress (hoop stress) and through-thickness stress (radial stress). A component of the through-thickness stress, which varies with radius, is an internal stress in which a radially outer portion of the component is pulled away from a radially inner portion (e.g., radial deflection and/or radial deformation). Such internal stress results in relatively high radially oriented tensile stress within the component. Thus, while it is generally desirable to use relatively lightweight materials to increase the energy per unit mass of a flywheel it is also desirable that the lightweight materials have, inter alia, high strength properties.

Accordingly, the embodiments described herein include a flywheel having a rotor formed from high strength composite materials, i.e. materials with a filament material embedded in a matrix material, in which the filament materials have a relatively high tensile strength that can sustain relatively high circumferential, or hoop, stress. Although the devices and methods are disclosed herein as including particular materials, any of the devices and methods described herein can use and/or can include any composite filament material, such as carbon fiber, Kevlar, glass fiber, high strength polyethylene fibers (e.g., Dyneema® & Spectra®), basalt fibers, and/or nanometer carbon fibers to increase the energy and/or power density of the flywheel per unit mass (e.g., by using materials with high tensile strength per unit mass). Specifically, in some embodiments, such carbon fiber can be, for example, T1000g from Toray or IMS65 from Toho, which have tensile strengths of 925,000 pounds per square inch (psi) and 870,000 psi, respectively. Composite materials, however, have a relatively low ability to resist failure due to tensile forces in the radial or through-thickness direction (e.g., radial deflection and/or deformation) because the high tensile strength filaments (e.g., carbon fibers) are generally oriented circumferentially. As a result, the other constituent(s) of the composite material (e.g., the polymeric matrix material of a carbon fiber composite or the like) carry the through-thickness tensile stress. Thus, the embodiments described herein are configured to mitigate the effect of through-thickness tensile stress on the constituent composite material forming at least a portion of the rotor of a flywheel while maintaining a high-energy storage density associated with the flywheel.

A discussion of the embodiments illustrated in FIGS. 1-12 is followed by a brief discussion of the mathematics and analytical results associated with the embodiments and/or methods described herein. It should be understood that the discussion of the theoretical and/or mathematical justification is presented by way of example to summarize one method of analysis and to provide a basis for the relevant principals; the discussion is not intended to be a full explanation thereof. Rather, the discussion of the theoretical and/or mathematical justification is presented to provide context to the specific embodiments and methods described herein.

FIG. 1 is a schematic illustration of an electromagnetic machine structure 100, according to an embodiment. The electromagnetic machine structure 100 can be any suitable machine, system, or portion thereof. For example, the electromagnetic machine structure 100 includes a flywheel 105, a support structure 160, and at least one set of bearings 162. As described in further detail herein, the flywheel 105 can be any suitable device and/or assembly configured to store energy. For example, the flywheel 105 can be a device and/or system configured to store energy in the form of rotational kinetic energy.

The support structure 160 can be, for example, a hub, a housing, an axle, etc. configured to support at least a portion of the flywheel 105. The bearing(s) 162 can be operably coupled between the support structure 160 and the rotor 110 of the flywheel 105. In this manner, the bearing(s) 162 can allow at least a portion of the rotor 110 to rotate relative to and/or otherwise about at least a portion of the support structure 160. In some embodiments, the bearing(s) 162 can be mechanical bearings such as ball bearings, pin bearings, etc. In other embodiments, the bearing(s) 162 can be magnetic levitation, active or passive magnetic stabilization bearings, gas bearings, or the like configured to rotatably support a portion of the rotor 110 via magnetic and/or fluidic (gas) levitation or the like. In other embodiments, the bearing(s) 162 can be a hybrid bearing (e.g., a mechanical/magnetic hybrid or the like). As such, the support structure 160 and/or the bearing(s) 162 support at least a portion of the rotor 110 to allow for rotational motion of at least a portion thereof.

In this embodiment, the flywheel 105 is an electromechanical device that receives energy from and/or delivers (discharges) energy to an electrical load/source 170. The electrical load/source 170 can be, for example, a utility, industrial, military, and/or any other suitable grid infrastructure. In other embodiments, the electrical load/source 170 can be, for example, any suitable commercial and/or residential electrical load/source. In addition, any suitable electrical conditioning device and/or system 172 can be electrically connected between the flywheel 105 and the electrical load/source 170. Such electrical conditioning 172, for example, can change, alter, and/or otherwise condition a voltage, current, phase, frequency, and/or the like associated with the electric energy received from the motor/generator 130.

As shown in FIG. 1, the flywheel 105 includes at least a rotor 110 having a magnet assembly 120 and a stator assembly 140 having a set of stator windings or coils (not separately shown in FIG. 1) that collectively form an integrated motor/generator 130 included in the flywheel 105. The flywheel 105 and/or the components thereof can have any suitable arrangement and/or configuration, as described herein with reference to specific embodiments. For example, the flywheel 105 and/or the motor/generator 130 can be an axial flux or radial flux permanent magnet machine. In such embodiments, the rotor 110 of the flywheel 105 can be rotated relative to the stator assembly 140 such that magnetic flux associated with the rotation of permanent magnets included in the magnet assembly 120 induces a flow of electric current within the stator windings of the stator assembly 140.

The flywheel 105 is configured to receive sufficient electric energy from the electrical load/source 170 to rotate the rotor 110 with a desired rotational energy and velocity, thereby transforming the input power (e.g., the electric energy) into kinetic energy associated with the rotation of the rotor 110 relative to the stator assembly 140 (see e.g., Equations 1 and 2 above). For example, in some embodiments, the rotational velocity associated with the rotor 110 can be between about 1,000 revolutions per minute (rpm) and about 10,000 rpm, between about 10,000 rpm and about 20,000 rpm, between about 20,000 rpm and about 30,000 rpm, between about 30,000 rpm and about 40,000 rpm, between about 40,000 rpm and about 50,000 rpm, or more. In at least one embodiment, the rotational velocity associated with the rotor 110 can be about 36,000 rpm. The flywheel 105 is also configured to discharge at least a portion of the kinetic energy, for example, by inducing an electric current to flow within a portion of the motor/generator 130 (e.g., the stator windings or coils included in the stator assembly 140), which slows the rotational velocity of the rotor 110. Moreover, the rotor 110 can be rotatably supported by the support structure 160 and the bearing(s) 162 with minimal losses (e.g., due to friction or the like) such that when the flywheel 105 is at steady state (e.g., the rotor 110 is spinning with substantially constant velocity and the motor/generator 130 is delivering little to no electric energy to the electrical load/source 170 or is electrically isolated therefrom), the flywheel 105 "stores" the kinetic energy associated with the rotation of the rotor 110.

In some embodiments, the rotor 110 can have a substantially annular cross-sectional shape. In other words, the rotor 110 has an inner surface, defining an inner radius of the rotor 110, and an outer surface, defining an outer radius of the rotor 110. The rotor 110 can be formed from composite materials such as those described above. The magnet assembly 120 is configured to be coupled to the inner surface of the rotor 110. The magnet assembly 120 can include any number of magnets that are circumferentially arranged along the inner surface of the rotor 110. In some embodiments, the circumferentially arranged magnets of the magnet assembly 120 can form a ring of magnets disposed at or on a segment of the inner surface along the longitudinal axis of the rotor 110. In addition, the magnet assembly 120 can include any suitable number of magnet rings, each of which is disposed at a different segment along the longitudinal axis of the rotor 110.

The arrangement of the magnet assembly 120 is such that a space is defined between each magnet ring and/or between axially adjacent magnets. In some embodiments, the magnets included in and/or collectively forming a ring of magnets can be segmented. That is to say, multiple magnets are arranged around the circumference of the inner surface to form the magnet ring with a substantially uniform space defined between each circumferentially adjacent magnet. In some embodiments, segmenting the magnets can, for example, reduce hoop, bending, and/or through-thickness stress within the magnets that could otherwise result in failure. In addition, the amount of segmentation of the magnets of the magnet assembly 120 (e.g., a number of magnets forming a circumferential ring of magnets) can at least partially control a frequency of the electric current associated with the rotation of the rotor 110 (e.g., the electric current delivered to the stator assembly 140 to rotate the rotor 110 or produced by the rotation of the rotor 110 relative to the stator assembly 140). In some embodiments, the angular rotation of the rotor 110 and the segmentation of the magnets of the magnet assembly 120 can result in a relatively high frequency of the electric current associated with the flywheel.

The stator assembly 140 can have a substantially circular (e.g., not hollow) or substantially annular cross-sectional shape. Moreover, the size of the stator assembly 140 can be associated with, for example, the inner radius of the rotor 110, thereby allowing the stator assembly 140 to be disposed within the rotor 110 with a desired air gap between at least a portion of an outer surface of the stator assembly 140 and at least a portion of an inner surface of the rotor 110 (e.g., a surface having the inner radius). In some embodiments, the stator assembly 140 can be coupled to the support structure 160 and/or to the fixed portion of the bearing(s) 162 such that the stator assembly 140 is maintained in a substantially fixed position while the rotor 110 rotates relative thereto.

The arrangement of the rotor 110 and the stator assembly 140 can be such that a portion of the stator assembly 140 is disposed within the space defined between axially adjacent magnets. For example, at least a portion of the stator windings (not shown in FIG. 1) can be disposed between the axially adjacent magnets (or the axially adjacent rings of magnets). Thus, a magnetic flux flowing within a flux flow path between and/or through the magnets included in the magnet assembly 120 is operative to induce electric current in the stator windings of the stator assembly 140, as the rotor 110 is rotated relative thereto. Moreover, as described above, the electric energy transferred to and/or extracted from the flywheel 105 can have a relatively high frequency electric current (e.g., based on the angular velocity of the rotor 110 and the segmentation of the magnets of the magnet assembly 120). Hence, the stator assembly 140 and/or the stator windings can be configured to minimize losses and/or heating associated with carrying the relatively high frequency electric current and/or high inductance along the conductors of the stator windings (e.g., the conductors have a surface area sufficient to support the high frequency and/or high inductance without short circuiting and/or overheating).

In some embodiments, the axially adjacent magnets of the magnet assembly 120 and the portion of the stator assembly 140 disposed therebetween collectively form and/or collectively function as a portion of the motor/generator 130. Moreover, in some embodiments, the inner surface of the rotor 110 can include any suitable number of uniformly spaced magnets and/or rings of magnets along a length of its axis. In some embodiments, the rotor 110 includes a number of uniformly spaced magnets and/or rings of magnets along substantially the entire axial length of the rotor 110. Similarly, the stator assembly 140 can include a number of portions having stator windings, each of which is disposed between different pairs of axially adjacent magnets. In other words, the motor/generator 130 can extend substantially the entire axial length of the flywheel 105. In some instances, increasing a portion of the flywheel 105 forming the motor/generator 130 can, for example, increase the amount of energy stored by the flywheel 105 (e.g., increase energy density) as well as the rate at which the flywheel 105 can charge or discharge energy (e.g., increase power density).

In some embodiments, the electromagnetic machine structure 100 is configured to produce and/or otherwise be associated with energy storage having a high energy density. For example, as shown in Equations 1 and 2, the energy E stored by the flywheel 105 is a function of the rotational velocity ω of the rotor 110 and the mass moment of inertia I of the rotor 110, which in turn, is a function of the mass m, the inner radius $r_i$, and the outer radius $r_o$ of the rotor 110. Thus, the energy density associated with the flywheel 105 can be increased by increasing at least one of the rotational velocity ω of the rotor 110, the mass m of the rotor 110, and/or the inner and outer radii $r_i$ and $r_o$ of the rotor 110. Moreover, as shown by Equations 1 and 2 above, the mass of the rotor 110 is a first order of magnitude variable while the rotational velocity of the rotor 110 is a second order of magnitude variable. Therefore, the gain in rotational velocity of the rotor 110 resulting from the increased strength per unit mass of the rotor 110 (e.g., due to using composite materials), exponentially increases the kinetic energy associated with the rotor 110.

As shown in FIG. 1, the flywheel 105 includes a set of mass loads 132 coupled to the inner surface of the rotor 110. The mass loads 132 can be magnetic (e.g., the mass loads 132 form the magnets included in the magnet assembly 120) or can be inert (e.g., nonmagnetic) and distinct from the magnets included in the magnetic assembly 130. For example, in some embodiments, the mass loads 132 can form the magnets of the magnet assembly 120 and can, for example, induce a flow of electric current in the stator windings of the stator assembly 140 and/or stabilize the rotor 110 via a magnetic bearing arrangement.

In other embodiments, the mass loads 132 are formed from stainless steel, tungsten alloy, metal loaded polymers, and/or other nonmagnetic material. For example, the mass loads 132 can be disposed at discrete positions along the inner surface of the rotor 110. In other embodiments, the mass loads 132 can cover the inner surface of the rotor 110 substantially in its entirety. Moreover, the mass loads 132 can have a relatively high density and thus, can have a smaller size while maintaining the same mass. Similarly, the mass loads 132 can have a mass per unit area on the inner surface of the rotor, and or a density, that is substantially equal to that of the magnets in the magnet assembly 120 and/or in a magnetic stabilization system. Thus, when the mass loads 132 and the magnets of the magnet assembly 120 cover the inner surface of the rotor 110 substantially in its entirety, the mass loads 132 and magnets of the magnet assembly 120 exert a substantially uniform force on the inner surface of the rotor 110 as the rotor 110 rotates about its axis. In some embodiments, the mass loads 132 are segmented into structurally discrete elements, and optionally such that a desired distance is defined between adjacent magnets—in either a circumferential direction or an axial direction. By segmenting the mass loads 132, the stresses exerted on and/or in the mass loads 132 resulting from the centrifugal effects of the rotor's rotation can be reduced. In addition, segmenting the mass loads 132 can allow for increased scalability.

The arrangement of the mass loads 132 on the inner surface of the rotor 110 results in a different stress state than the stress state otherwise associated with the rotor 110 while it is rotating. For example, the mass loads 132 are configured to exert an additional force on the inner surface of the rotor 110 as a result of centrifugal effects associated with the rotation of the rotor 110. As such, the maximum through-thickness radial tensile stress otherwise limiting the rotational velocity of the rotor 110 is reduced. More specifically, the force exerted by the mass loads 132 on the inner surface of the rotor 110 can, in some instances, place the rotor 110 (or the constituent material forming the rotor 110) in a compressive through-thickness state, which is desired due to the composite material's strength under through-thickness compression compared to through-thickness tension. In addition, the uniformity of the force exerted on the inner surface of the rotor 110 can stabilize non-uniform dynamic loading associated with increasing and/or decreasing the rotational velocity of the rotor 110.

Figure 2:
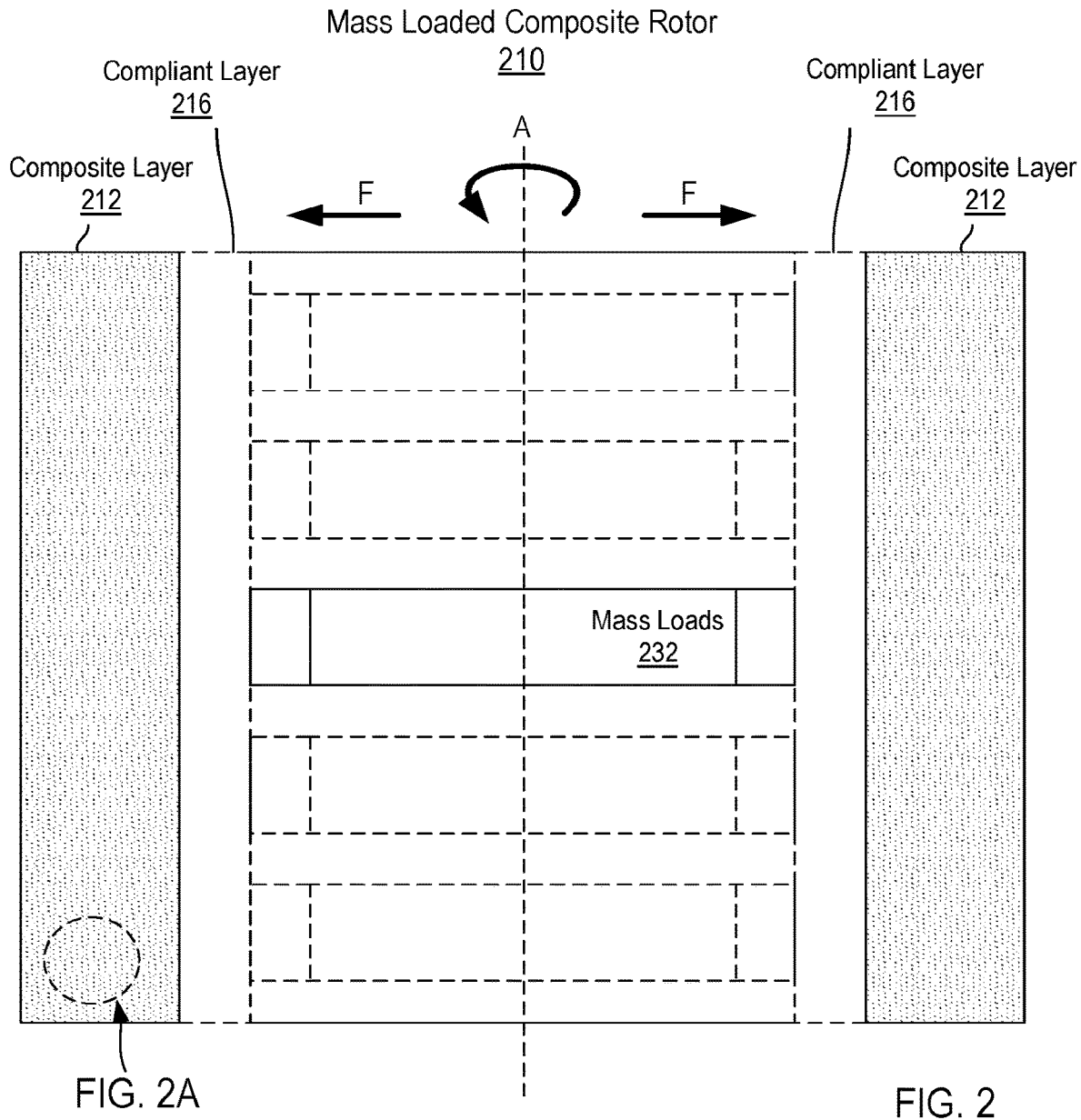
FIG. 2 is a schematic illustration of an electromagnetic machine structure according to another embodiment.
Figure 2A:
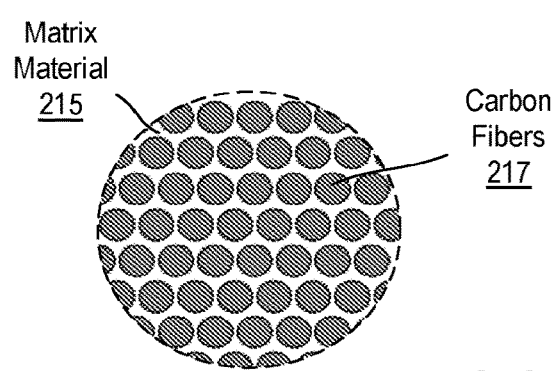
FIG. 2A is an enlarged schematic illustration of a portion of the electromagnetic machine structure shown in FIG. 2 and identified as the region labeled FIG. 2A.

FIG. 2 is a schematic illustration of a mass loaded composite rotor 210 according to an embodiment. In some embodiments, the mass loaded composite rotor 210 (also referred to herein as "rotor") can be any suitable rotor configured to be included in a flywheel energy storage device such as, for example, the flywheel 105 described above with reference to FIG. 1. As such, the rotor 210 can be configured to rotate about an axis A relative to a stator assembly (not shown in FIG. 2). As described above with reference to the rotor 110, the rotor 210 can be caused to rotate to, for example, store energy in the form of rotational kinetic energy. Moreover, the rotation of the rotor 210 relative to a stator assembly (e.g., the stator assembly 140) can be such that magnetic flux associated with the rotation of permanent magnets included in and/or coupled to the rotor 210 induces a flow of electric current within the stator windings of the stator assembly 140.

The rotor 210 can be any suitable shape, size, and/or configuration. For example, in some embodiments, the rotor 210 has a substantially annular shape within which at least a portion of a stator assembly or the like can be disposed. The rotor 210 can be formed from composite materials such as those described above. More specifically, as shown in FIG. 2, the rotor 210 includes a composite layer 212 and, optionally, a compliant layer 216. The composite layer 212, for example, can be formed of a high-strength carbon fiber composite. The composite layer 212 includes a polymeric matrix material 215 such as, for example, epoxy resin or the like with carbon fibers 217 embedded therein. In such embodiments, the carbon fibers 217 can be arranged and/or oriented substantially in a circumferential direction. As described above, the composite layer 212 can provide relatively high strength properties with a relatively low density, thereby increasing the strength of the rotor 210 and a rate at which the rotor 210 can rotate before failure due to centrifugal effects.

As shown in FIG. 2, the optional compliant layer 216 is disposed within the composite layer 212, in contact with and coupled to (e.g., via a chemical or mechanical coupling) the inner surface of the composite layer 212. The compliant layer 216 can be formed of a generally compliant material having a lower modulus of elasticity than the composite layer 212. For example, in some embodiments, the compliant layer 216 is formed of a glass or glass composite. As described in further detail herein, the compliant layer 216 can be configured to distribute a force F otherwise exerted on the composite layer 212 to reduce, for example, localized stress concentrations.

The rotor 210 further includes one or more sets of mass loads 232 coupled to an inner surface of the compliant layer 216. The mass loads 232 can be magnetic and/or can be inert (e.g., nonmagnetic). For example, in some embodiments, the mass loads 232 can be magnets included in a magnet assembly of a flywheel. The mass loads 232 can have a relatively high density when compared, for example, to the compliant layer 216 and/or the composite layer 212. As shown in FIG. 2, each set of mass loads 232 is circumferentially arranged, and the sets of mass loads are uniformly distributed along a length of the rotor 210 parallel to the axis A. In embodiments in which stator windings are disposed axially between adjacent sets of magnetic mass loads 232, the axially adjacent sets of mass loads 232 are axially spaced to receive the stator windings.

While the mass loads 232 are shown in FIG. 2 as defining a space therebetween, in other embodiments, the rotor 210 can include mass loads 232 configured to cover substantially the entire inner surface of the rotor 210 (i.e. the compliant layer 216 if included, or the composite layer 212 if the compliant layer 216 is not included). For example, in some embodiments, a first portion of the mass loads 232 can be magnetic mass, which can be substantially similar in form and/or function to the magnets included in the magnet assembly 120 described above in detail with reference to FIG. 1. In such embodiments, a second portion of the mass loads 232 can be disposed, for example, between the axially adjacent magnetic mass loads 232. In some embodiments, the second portion of the mass loads 232 can have substantially the same density as the first portion of the mass loads 232 or can have a greater density than the first portion of the mass loads 232. When the mass loads 232 (e.g., the first portion and the second portion of the mass loads 232) cover the inner surface of the compliant layer 216 substantially in its entirety, the mass loads 232 exert a substantially uniform force F per unit area on the inner surface of the compliant layer 216 as the rotor 210 rotates about the axis A. As described above, the arrangement of the compliant layer 216 is such that the otherwise localized force F per unit area exerted by the mass loads 232 on the compliant layer 216 is uniformly distributed on the inner surface of the composite layer 212. Thus, as the rotor 210 is rotated about the axis A, a substantially uniform stress is exerted (e.g., via the compliant layer 216) on the inner surface of the composite layer. In some instances, such an arrangement can, for example, increase a dynamic stability of the overall rotor system.

As described above with reference to the rotor 110, the mass loads 232 exert an additional force on the inner surface of the composite layer 212 as a result of centrifugal effects associated with the rotation of the rotor 210. As such, the force F uniformly exerted by the mass loads 232 on the inner surface of the composite layer 212 (via the compliant layer 216) reduces through-thickness tensile radial stress otherwise limiting the rotational velocity of the rotor 210. The force F can, in some instances, place the rotor 210 (or the constituent material forming the rotor 210) in a compressive through-thickness state throughout the rotor. Moreover, as described above with reference to the flywheel 105, by uniformly distributing the mass loads 232 (e.g., magnetic mass loads) the energy density and/or power density of a flywheel within which the rotor 210 is included can be increased by substantially maximizing a portion of the flywheel collectively forming and/or configured as a motor/generator.

Figure 3:
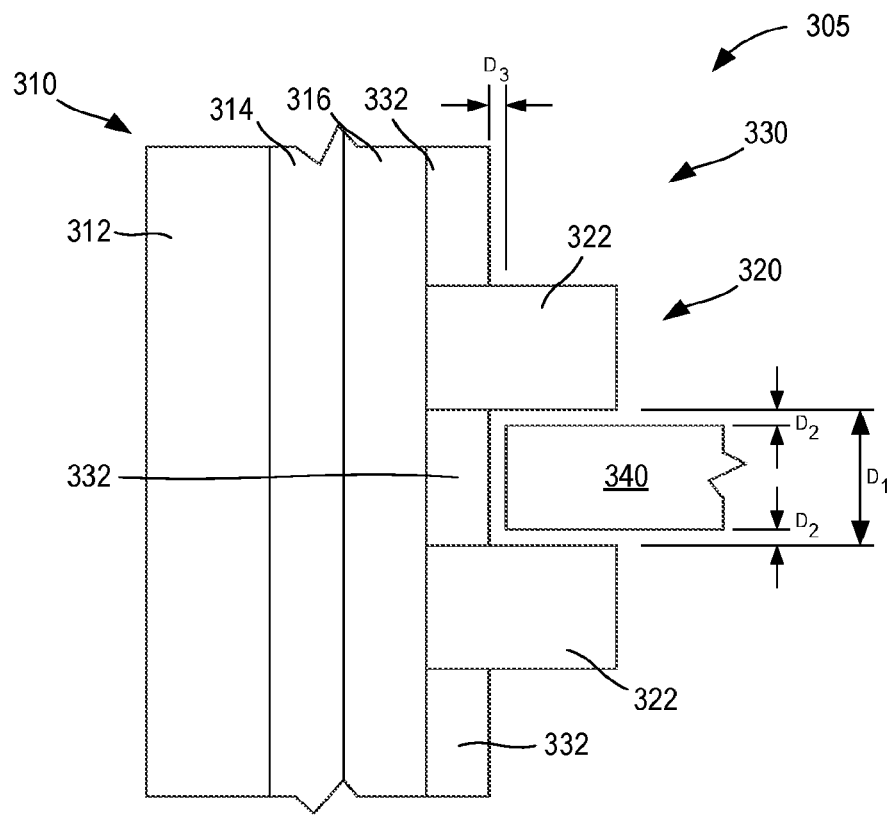
FIGS. 3 and 4 are schematic illustrations of a portion of an electromagnetic machine structure showing, for example, a motor/generator portion thereof, each according to a different embodiment.

FIG. 3 is a schematic illustration of a portion of a flywheel 305 according to another embodiment. The portion of the flywheel 305 can be included in any suitable machine and/or system configured to receive, store, and discharge energy. In some embodiments, the portion of the flywheel 305 can be substantially similar to and/or included in, for example, the flywheel 105 described above with reference to FIG. 1. Thus, aspects of the portion of the flywheel 305 are not described in further detail herein.

The flywheel 305 (or portion thereof) includes a rotor 310 configured to rotate relative to a stator 340, as described above with reference to the flywheel 105. The stator 340 can be any suitable shape, size, or configuration. For example, in some embodiments, the stator 340 can be substantially similar to the stator assembly 140 described above with reference to FIG. 1. Therefore, although not shown in FIG. 3, the stator 340 can include any number of stator windings or the like configured to receive a flow of electric current, as described in further detail herein.

The rotor 310 of the flywheel 305 includes a first layer 312, a second layer 314, and a third layer 316. The first layer 312 can be a high-strength composite layer such as, for example, a carbon composite layer, as described above with reference to the rotor 110 (FIG. 1) and/or the rotor 210 (FIG. 2). The second layer 314 can be a composite layer having a strength that is less than the strength of the first layer 312. For example, in some embodiments, the second layer 314 can be a glass/carbon composite layer or the like. In such embodiments, the glass/carbon fibers can be embedded in a polymeric matrix material such as, for example, epoxy resin. Thus, the second layer 314 can be similar to the first layer 312; however, the use of glass fibers results in a more compliant composite material when exposed to a force. The third layer 316 can be a compliant layer having a strength that is less than the strength of the second layer 314. For example, in some embodiments, the third layer 316 can be a compliant glass layer, or glass composite layer or the like. In such embodiments, the glass material and/or glass composite material can be more compliant, for example, than the glass/carbon composite and/or the carbon composite when exposed to a force.

As shown in FIG. 3, the rotor 310 includes a magnet assembly 320 and a set of mass loads 332 coupled to a surface of the third layer 316 (e.g., the glass layer). The magnet assembly 320 includes two sets of magnets 322. The sets of magnets 322 can be coupled to the third layer 316 via any suitable coupling such as, for example, an adhesive, a mechanical fastener, an interference fit, an intervening structure attached to the third layer 316, and/or the like. Moreover, the sets of magnets 322 are coupled to the third layer 316 at different positions along an axial length of the rotor 310 such that a distance $D_1$ is defined therebetween. As shown, the distance $D_1$ is sufficient to allow a portion of the stator 340 to be disposed between the magnets 322.

The mass loads 332 can be any suitable shape, size, and/or configuration. For example, in the embodiment illustrated in FIG. 3, the rotor 310 includes a set of mass loads 332 coupled to the third layer 316 on each side of each of the sets of magnets 322. More specifically, a first set of mass loads 332 can be disposed on a first side of a first set of magnets 322, a second sets of mass loads 332 can be disposed on a first side of a second set of magnets 322, and a set of third mass loads 332 can be disposed on a second side of the first set of magnets 322 and a second side of the second set if magnets 322 (i.e. axially between the two sets of magnets 322). In some embodiments, the sets of mass loads 332 can be disposed adjacent to and in contact with one or more magnets 322. In other words, the sets of magnets 322 and the sets of mass loads 332 can substantially cover an inner surface of the third layer 316 substantially in its entirety. As described in further detail herein, by covering substantially the entirety of the inner surface of the third layer 316, the sets of mass loads 332 and the sets of magnets 322 can exert a substantially uniform pressure on the third layer 316 as the rotor 310 rotates about its axis.

In this embodiment, the each mass load in the sets of mass loads 332 can be formed of an inert (e.g., nonmagnetic) material such as, for example, stainless steel, tungsten alloy, and/or the like. Moreover, the constituent material forming the mass loads can be a relative high-density material. For example, in some embodiments, the mass loads and/or the constituent material forming the mass loads in the set of mass loads 332 have a density greater than a density of the magnets in the sets of magnets 322. As shown in FIG. 3, by including mass loads with a density greater than a density associated with the magnets, the size (e.g., radial thickness) of the mass loads can be less than an associated size of the magnets while maintaining substantially the same mass.

As described above, a portion of the stator 340 is disposed in the space defined between the sets of magnets 322. More specifically, the portion of the stator 340 can be centered in the axial direction between the sets of magnets 322 such that a distance $D_2$ is defined between opposite surfaces of the stator 340 and an associated surface of the respective set of magnets 322, as shown in FIG. 3. Furthermore, the arrangement of the rotor 310 is such that a distance $D_3$ is defined between a radially outer surface of the stator 340 and a radially inner surface of the mass load 332 disposed between the magnets 322. In some embodiments, distance $D_2$ can be substantially the same as distance $D_3$, i.e. the same air gap can be defined between the stator 340 and the sets of magnets 322 and/or sets of mass loads 332. This arrangement can, for example, increase stability of the portion of the flywheel 305 as the rotor 310 rotates about the stator 340.

As described above with reference to the flywheel 105 (FIG. 1) and the flywheel 205 (FIG. 2), the rotor 310 and the stator 340 collectively form an integrated motor/generator 330 included in the flywheel 305. More specifically, the arrangement of the portion of the stator 340 disposed between adjacent sets of magnets 322 form, for example, an axial flux permanent magnet motor/generator. Thus, the stator 340 can receive a flow of electric current, which in turn, energizes the stator windings. As such, the electric current flowing in or along the stator windings can interact with the magnetic flux flowing between and/or through the adjacent sets of magnets 322 of the magnet assembly 320 to rotate the rotor 310 relative to the stator 340. As such, the portion of the flywheel 305 can store at least a portion of the electric energy as rotational kinetic energy. In addition, the portion of the flywheel 305 can be transitioned into, for example, a discharge state, in which the magnetic flux flowing between and/or through the sets of magnets 322 induces a flow of an electric current within the stator windings to an electric load or the like.

In some embodiments, the arrangement of the sets of mass loads 332 and the sets of magnets 322 on the inner surface of the third layer 316 results in a different stress state within each of the first layer 312, second layer 314, and third layer 316 of the rotor 310 than would otherwise be produced by rotation of the rotor 310. For example, as the rotor 310 rotates about its axis, the sets of mass loads 332 and the sets of magnets 322 exert additional radially-outwardly-directed forces on the inner surface of the third layer 316 as a result of centrifugal effects associated with the rotation of the rotor 310. As such, the maximum through-thickness radial tensile stress within the first layer 312, second layer 314, and/or third layer 316 that would otherwise limit the rotational velocity of the rotor 310 is reduced. In some embodiments, the force exerted by the sets of mass loads 332 and the sets of magnets 322 can place the layers 312, 314, and 316 of the rotor 310 in an entirely compressive through-thickness state, as described above with reference to the flywheel 105 in FIG. 1. Moreover, by forming the rotor 310 with layers 312, 314, and 316 that consecutively increase in strength as a function of the radius of the rotor 310, the forces associated with the centrifugal effects on the rotor 310, magnets 322, and mass loads 332 are uniformly distributed through the layers 312, 314, and 316, which can stabilize non-uniform dynamic loading associated with increasing and/or decreasing the rotational velocity of the rotor 310.

Figure 4:
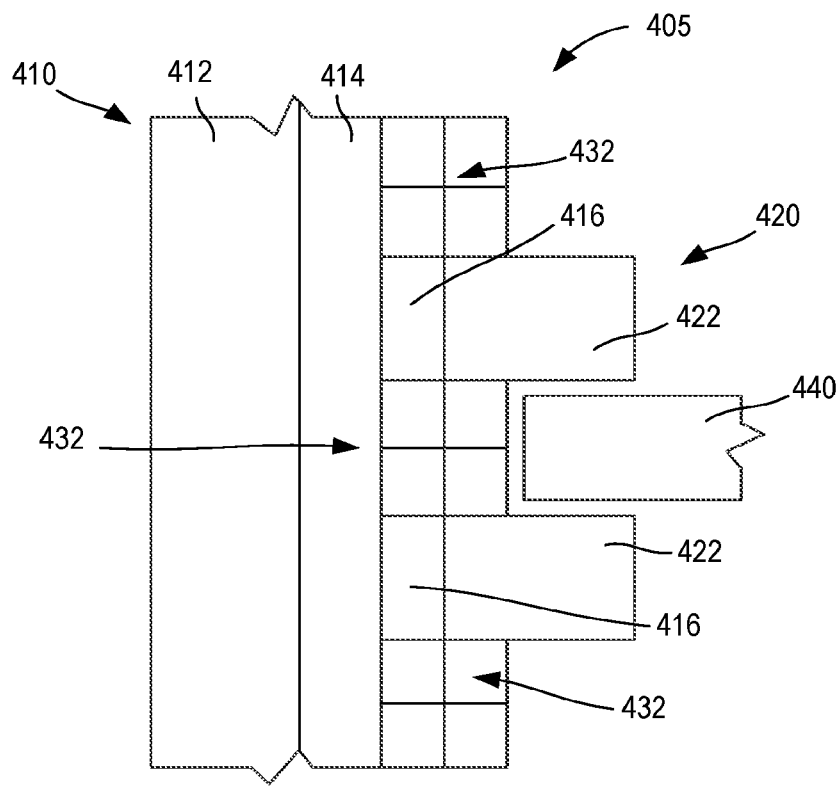

While the rotor 310 included in the portion of the flywheel 305 is particularly shown and described above with reference to FIG. 3, in other embodiments, a portion of a flywheel can include a rotor having any suitable arrangement and/or configuration. For example, FIG. 4 is a schematic illustration of a portion of a flywheel 405 according to another embodiment. The portion of the flywheel 405 can be included in any suitable machine and/or system configured to receive, store, and discharge energy. In some embodiments, the portion of the flywheel 405 can be substantially similar to and/or included in, for example, the flywheel 105 described above with reference to FIG. 1. Furthermore, aspects of the portion of the flywheel 405 can be substantially similar in form and/or function to associated aspects of the portion of the flywheel 305. Thus, aspects of the portion of the flywheel 405 are not described in further detail herein.

The flywheel 405 (or portion thereof) includes a rotor 410 configured to rotate relative to a stator 440, as described above with reference to the flywheel 105. The stator 440 can be any suitable shape, size, or configuration. For example, in some embodiments, the stator 440 can be substantially similar to the stator assembly 140 described above with reference to FIG. 1. Therefore, although not shown in FIG. 4, the stator 440 can include any number of stator windings or the like configured to receive a flow of electric current, as described in further detail herein.

The rotor 410 of the flywheel 405 includes a first layer 412, a second layer 414, and a third layer 416. The first layer 412 can be a high-strength composite layer (e.g., a carbon composite layer or the like), as described above with reference to the rotor 110 (FIG. 1) and/or the rotor 210 (FIG. 2). The second layer 414 can be a composite layer having a strength that is less than the strength of the first layer 412 (e.g., a glass composite layer or the like), as described above with reference to the flywheel 305 shown in FIG. 3. The third layer 416 can be a compliant layer having a strength that is less than the strength of the second layer 414 (e.g., a compliant glass or the like), as described above with reference to the rotor 310 shown in FIG. 3.

As shown in FIG. 4, the rotor 410 includes a magnet assembly 420 coupled to the third layer 416 (e.g., the compliant glass layer) and a set of mass loads 432 coupled to, for example, a surface of the second layer 414 (e.g., the glass composite layer). The magnet assembly 420 includes a pair of sets of magnets 422. The magnet assembly 420 is substantially similar to the magnet assembly 320 described above with reference to FIG. 3 and thus, is not described in further detail herein. While the third layer 316 of the rotor 310 was shown in FIG. 3 as extending substantially the entire length of the portion of the rotor 310, in the embodiment shown in FIG. 4, the third layer 416 is disposed between the magnets 422 and the second layer 414 and not the mass loads 432 and the second layer 414. In some embodiments, limiting the third layer 416 to segments along an axial length of the rotor 410 associated with the sets of magnets 422 can, for example, reduce the weight of the rotor 410 while still mitigating the centrifugal effects on the sets of magnets 422 and rotor 410 (e.g., shear stress, through-thickness stress, etc.).

The mass loads in the sets of mass loads 432 can be any suitable shape, size, and/or configuration. For example, in the embodiment illustrated in FIG. 4, the rotor 410 includes a set of mass loads 432 coupled to the second layer 414 on each side of each of the sets of the magnets 422, similar to the arrangement of the rotor 310 shown in FIG. 3. In this embodiment, the sets of mass loads 432 are segmented, for example, into smaller cross-sectional areas (e.g., in the radial plane) than an associated cross-sectional area of the magnets 422. In some instances, segmenting the sets of mass loads 432 can be based, at least in part, on the density of the mass loads and the associated stresses resulting from the rotation of the rotor 410. Thus, by reducing the cross-sectional size of each of the mass loads the stresses acting on or in the mass loads as well as those acting on the rotor 410 can be reduced. Moreover, by segmenting the mass loads into smaller cross-sectional areas, for example, can allow the mass loads to be coupled to the second layer 414 of the rotor 410 without the third layer 416 being disposed therebetween. In this manner, the portion of the flywheel 405 can be substantially similar in at least function to any of the flywheels 105, 205, and/or 305 described herein.

Figure 5:
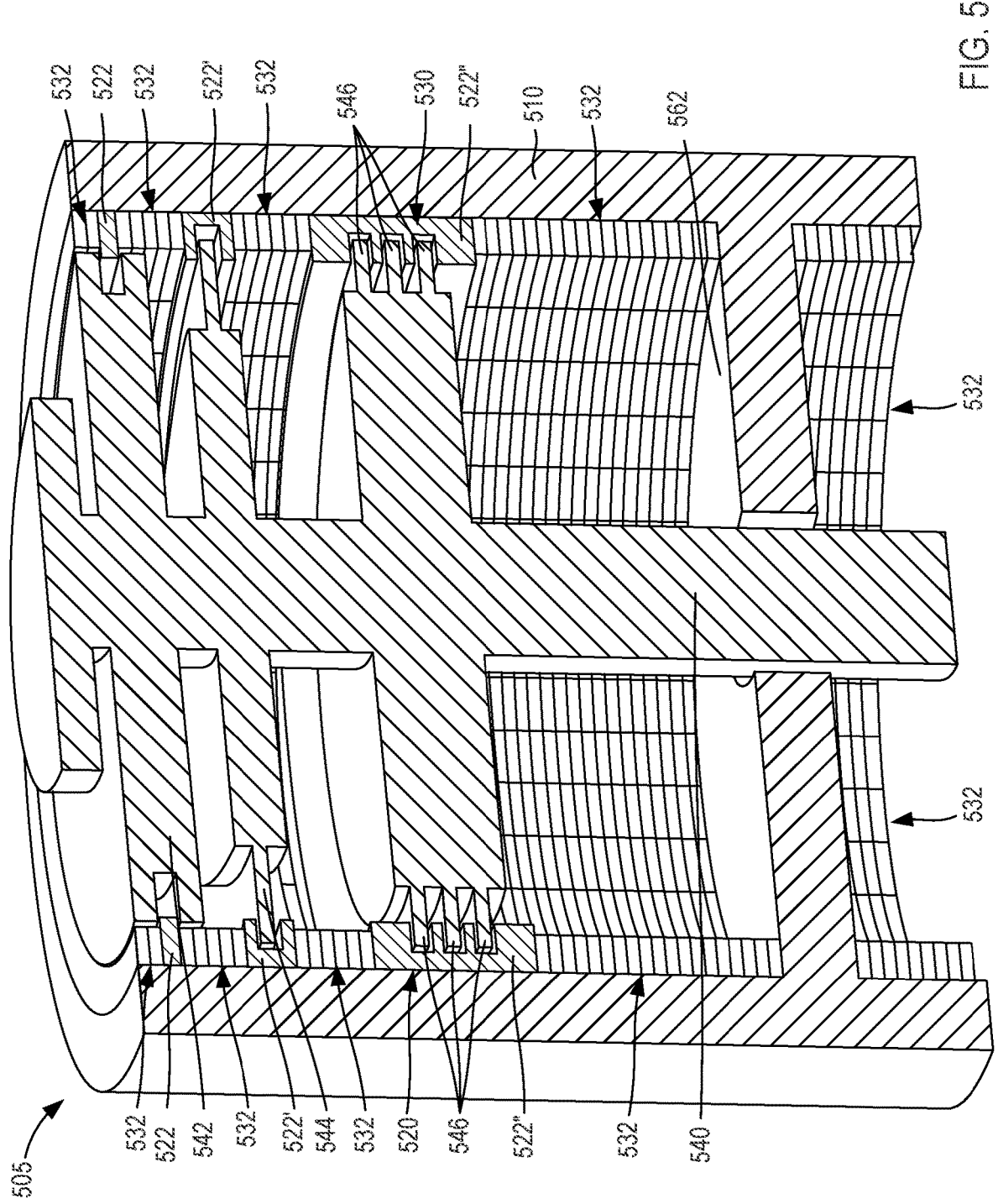
FIG. 5 is a cross-sectional perspective illustration of a flywheel according to an embodiment.

FIG. 5 is a cross-sectional illustration of a flywheel 505, according to an embodiment. The flywheel 505 can be any suitable machine, system, or portion thereof. For example, the flywheel 505 can be a device, machine, and/or system configured to store energy in the form of rotational kinetic energy. In this manner, the flywheel 505 is an electromechanical device that receives energy from and/or delivers (discharges) energy to an electrical load/source such as, for example, a utility, industrial, military, and/or any other suitable grid infrastructure. In other embodiments, the electrical load/source can be, for example, any suitable commercial and/or residential electrical load/source. In some embodiments, portions of the flywheel 505 can be similar to and/or substantially the same as associated portions of the flywheels 105, 205, 305, and/or 405 described above and thus, portions of the flywheel 505 similar to those previously described are not described in further detail herein.

As shown in FIG. 5, the flywheel 505 includes at least a rotor 510 having a magnet assembly 520 and multiple sets of mass loads 532, and a stator 540 having a set of stator windings or coils (not shown in FIG. 5). The flywheel 505 and/or the components thereof can have any suitable arrangement and/or configuration. For example, as shown in FIG. 5, a portion of the flywheel 505 can form a motor/generator 530 configured as an axial flux permanent magnet machine. In such embodiments, the rotor 510 of the flywheel 505 can be rotated relative to the stator 540 such that magnetic flux associated with the rotation of permanent magnets included in the magnet assembly 520 induces a flow of electric current within the stator windings of the stator 540.

The flywheel 505 is configured to receive sufficient electric energy from the electrical load/source to rotate the rotor 510 with a desired rotational velocity, thereby transforming the input energy (e.g., the electric energy) into rotational kinetic energy (see e.g., Equations 1 and 2 above), as described above with reference to the flywheel 105 illustrated in FIG. 1. The flywheel 505 is also configured to discharge at least a portion of the rotational kinetic energy, for example, by inducing an electric current to flow within a portion of the motor/generator 530 (e.g., the stator windings or coils included in the stator 540), which slows the rotational velocity of the rotor 510.

As shown in FIG. 5, the stator 540 has a substantially circular (e.g., not hollow) cross-sectional shape that can be associated with, for example, an inner surface of the rotor 510, thereby allowing the stator 540 to be disposed within the rotor 510. In some embodiments, the stator 540 can be coupled to any suitable support structure (not shown) configured to maintain the stator 540 in a substantially fixed position while the rotor 510 rotates relative thereto. Moreover, the rotor 510 and/or the stator 540 can include a bearing 562 disposed therebetween configured to support at least a portion of the rotor 510 as it rotates relative to the stator 540. In some embodiments, the bearing 562 can be, for example, a static mechanical bearing such as a ball bearing or pin bearing. The stator 540 includes a bearing portion 542, a stabilization portion 544, and a motor/generator portion 546 each of which is configured to interact with a portion different portion of the rotor 510, as described in further detail herein.

As shown in FIG. 5, the rotor 510 has a substantially annular cross-sectional shape. In other words, the rotor 510 has an inner surface, defining an inner radius of the rotor 510, and an outer surface, defining an outer radius of the rotor 510. The rotor 510 can be formed from composite materials such as those described above. Moreover, while the rotor 510 is shown in FIG. 5 as including a single layer and/or is shown as being formed by a single composite material, in other embodiments, the rotor 510 can include any suitable number of layers, which can each be formed of a different composite material. For example, in some embodiment, the rotor 510 can include three layers (e.g., a high-strength carbon composite outer layer, a glass/carbon composite middle layer, and a glass and/or glass composite inner layer, as described above with reference to the rotors 310 and 410.

The magnet assembly 520 is coupled to the inner surface of the rotor 510. The magnet assembly 520 can include any number of magnets that are circumferentially arranged along the inner surface of the rotor 510, in one or more axially distributed sets of magnets. For example, as shown in FIG. 5, the magnet assembly 520 includes a set of bearing magnet(s) 522, a set of stabilization magnet(s) 522', and one or more sets of motor/generator magnet(s) 522". The circumferentially arranged magnets (e.g., the bearing magnet(s) 522, the stabilization magnet(s) 522', and the motor/generator magnet(s) 522") each can be one magnet or can be any suitable number of segmented magnets. In some embodiments, segmenting the magnets can reduce stresses within and/or otherwise exerted by the magnets during rotation of the rotor 510 (e.g., bending stresses, shear stresses, through-thickness stresses, hoop stresses, and/or the like), as described above with reference to the rotor 110 (FIG. 1). In some embodiments, the circumferentially arranged magnets of the magnet assembly 520 can form a ring of magnets disposed at or on a desired segment of the inner surface along a longitudinal axis of the rotor 510. For example, the set of bearing magnet(s) 522 can be disposed at a first position along the longitudinal axis, the set of stabilization magnet(s) 522' can be disposed at a second position along the longitudinal axis different from the first position, and the one or more sets of motor/generator magnet(s) 522" can be disposed at third and other positions along the longitudinal axis different from the first position and the second position.

The bearing magnet(s) 522, the stabilization magnet(s) 522', and the motor/generator magnet(s) 522" (each of which is referred to henceforth as a single "magnet") can be any suitable magnet. For example, in some embodiments, the magnets can be formed from rare earth metals such as neodymium-iron-boride, samarium-cobalt, aluminum-nickel-cobalt, and/or the like. In other embodiments, the magnets can be electromagnets. In some embodiments, the magnets included in the magnet assembly 520 can be substantially similar (e.g., including substantially the same constituent material). In other embodiments, the magnets in the set of bearing magnets 522, the set of stabilization magnets 522', and/or the set(s) of motor/generator magnets 522" need not be similar.

The set of bearing magnets 522 and the set of stabilization magnets 522' each can have any arrangement and/or configuration suitable in defining a desired magnetic flux flow path. For example, in some embodiments, the set of bearing magnets 522 can produce magnetic flux that interacts with the bearing portion 542 of the stator 540. For example, in some embodiments, the magnetic flux flowing from and/or through the set of bearing magnets 522 can repel and/or otherwise levitate a segment of the bearing portion 542 of the stator 540. As such, the set of bearing magnets 522 and the bearing portion 542 of the stator 540 can collectively act as a low friction bearing via magnetic levitation. The set of stabilization magnets 522' can produce magnetic flux that interacts with a stabilization portion 544 of the stator 540. As such, the set of stabilization magnets 522' and the stabilization portion 544 of the stator 540 can collectively stabilize the rotor 510 and/or stator 540, for example, during acceleration or deceleration of the rotor 510. In some instances, the stabilization of the rotor 510 can reduce impact forces and/or non-uniform loading or motion that can otherwise damage the rotor 510 and/or stator 540. Thus, the bearing 562, the set of bearing magnets 522 and set of stabilization magnets 522' of the rotor 510, and the bearing portion 542 and stabilization portion 544 of the stator 540 collectively support and/or stabilize the rotor 510 as it rotates about the stator 540.

The set(s) of motor/generator magnets 522" of the magnet assembly 520 is configured to interact with a motor/generator portion 546 of the stator 540 to collectively define the motor/generator 530. While the set of motor/generator magnets 522" is shown in FIG. 5 as having a continuous cross-sectional shape that defines, for example, three notches within which a portion of the stator 540 is disposed, in other embodiments, the set of motor/generator magnets 522" can include any suitable number of sets of axially arranged magnets that collectively form the motor/generator magnet 522". In other words, the set of motor/generator magnets 522" can have any arrangement and/or configuration suitable in defining a flow path in which magnetic flux flows between and/or through the set of motor/generator magnets 522" to interact with at least a portion of the stator 540.

The arrangement of the rotor 510 and the stator 540 is such that the motor/generator portion 546 of the stator 540 is disposed within a space defined by the set of motor/generator magnets 522". For example, in some embodiments, the set of motor/generator magnet 522" defines a set of notches configured to receive the motor/generator portion 546 of the stator 540. In other embodiments, the set of motor/generator magnets 522" is formed by multiple sets of magnets that are axially arranged to define a space between axially adjacent sets of magnets configured to receive the motor/generator portion 546 of the stator 540. In some embodiments, the motor/generator portion 546 of the stator 540 can include, for example, stator windings and/or coils (not shown in FIG. 5) disposed within the notches and/or the space between the axially adjacent magnets (or the axially adjacent rings of magnets). The arrangement of the set of motor/generator magnets 522" of the rotor 510 and the motor/generator portion 546 of the stator 540 is such that a desired air gap is defined therebetween. More specifically, the arrangement of the motor/generator portion 546 of the stator 540 disposed between the set(s) of motor/generator magnets 522 collectively form, for example, an axial flux permanent magnet motor/generator (e.g., the motor/generator 530). Thus, the flywheel 505 can be configured to receive a flow of electric current operative to rotate the rotor 510 relative to the stator 540 and/or can induce a flow of electric current (e.g., within the stator windings and/or coils), which can be delivered to a load, as described in detail above with reference to the flywheels 105, 205, 305, and/or 405.

As described above, the rotor 510 includes sets of mass loads 532. The sets of mass loads 532 can be magnetic (e.g., the mass loads 532 form the magnets included in the magnet assembly 520) or can be inert (e.g., nonmagnetic) and distinct from the magnets included in the magnetic assembly 530. For example, in some embodiments, the mass loads 532 can form the magnets of the magnet assembly 520 and can, for example, induce a flow of electric current in the stator windings of the stator 540 and/or stabilize the rotor 510. In this embodiment, however, the sets of mass loads 532 are formed from stainless steel, tungsten alloy, metal loaded polymers, and/or other nonmagnetic material. As shown in FIG. 5, the sets of mass loads 532 cover substantially the entire inner surface of the rotor 510 except for segments of the rotor 510 otherwise covered by and/or coupled to the set of bearing magnets 522, set of stabilization magnets 522', and set(s) of motor/generator magnets 522".

In some embodiments, each mass load in the sets of mass loads 532 can have a mass and radially facing area that is substantially equal to a mass of each of the magnets in the magnet assembly 520. Thus, when the sets of mass loads 532 and the sets of magnets 522, 522', and 522" of the magnet assembly 520 cover the inner surface of the rotor 510 substantially in its entirety, the mass loads and magnets exert a substantially uniform force per unit area (or pressure) on the inner surface of the rotor 510 as the rotor 510 rotates about its axis. In some embodiments, the mass loads can have a density that is greater than a density of the magnets and thus, can have a smaller size (e.g., radial thickness) while maintaining the same mass (and, e.g., mass per unit area). In some embodiments, each set of mass loads 532 is segmented circumferentially into structurally discrete mass loads, either circumferentially spaced, or abutting. Similarly, the sets of mass loads 532 can be spaced axially such that a desired axial distance is defined between adjacent sets of magnets, or the sets of mass loads 532 can be abutting. By segmenting each set of mass loads 532, the stresses exerted on and/or in each individual mass load resulting from the centrifugal effects can be reduced. Thus, the arrangement of the sets of mass loads 532 and the magnet assembly 520 on the inner surface of the rotor 510 results in a stress state associated with the rotation of the rotor 510 that is different from the stress state otherwise associated with rotation of the rotor 510 without the sets of mass loads 532. As a result, the rotational velocity of the rotor 510 can be increased, which in turn, increases an energy and/or power density associated with the flywheel 505, as described in detail above with reference to at least the flywheels 105 (FIG. 1) and/or 205 (FIG. 2).

In some embodiments, a flywheel can be configured for high power storage density as well as high-energy storage density. For example, FIGS. 6-9 illustrate a flywheel 605 (or portions thereof) according to an embodiment. The flywheel 605 can be any suitable machine, system, or portion thereof. For example, in some embodiments, the flywheel 605 is configured to receive electric energy to rotate a portion thereof at a desired rotational velocity, thereby transforming the electric energy into rotational kinetic energy (see e.g., Equations 1 and 2 above) and is also configured to discharge at least a portion of the rotational kinetic energy, for example, by inducing an electric current to flow from the flywheel 605 to an electric load (as described in detail above). In some embodiments, portions of the flywheel 605 can be similar to and/or substantially the same as associated portions of the flywheels 105, 205, 305, 405, and/or 505 described above and thus, portions of the flywheel 605 similar to those previously described are not described in further detail herein.

Figure 6:
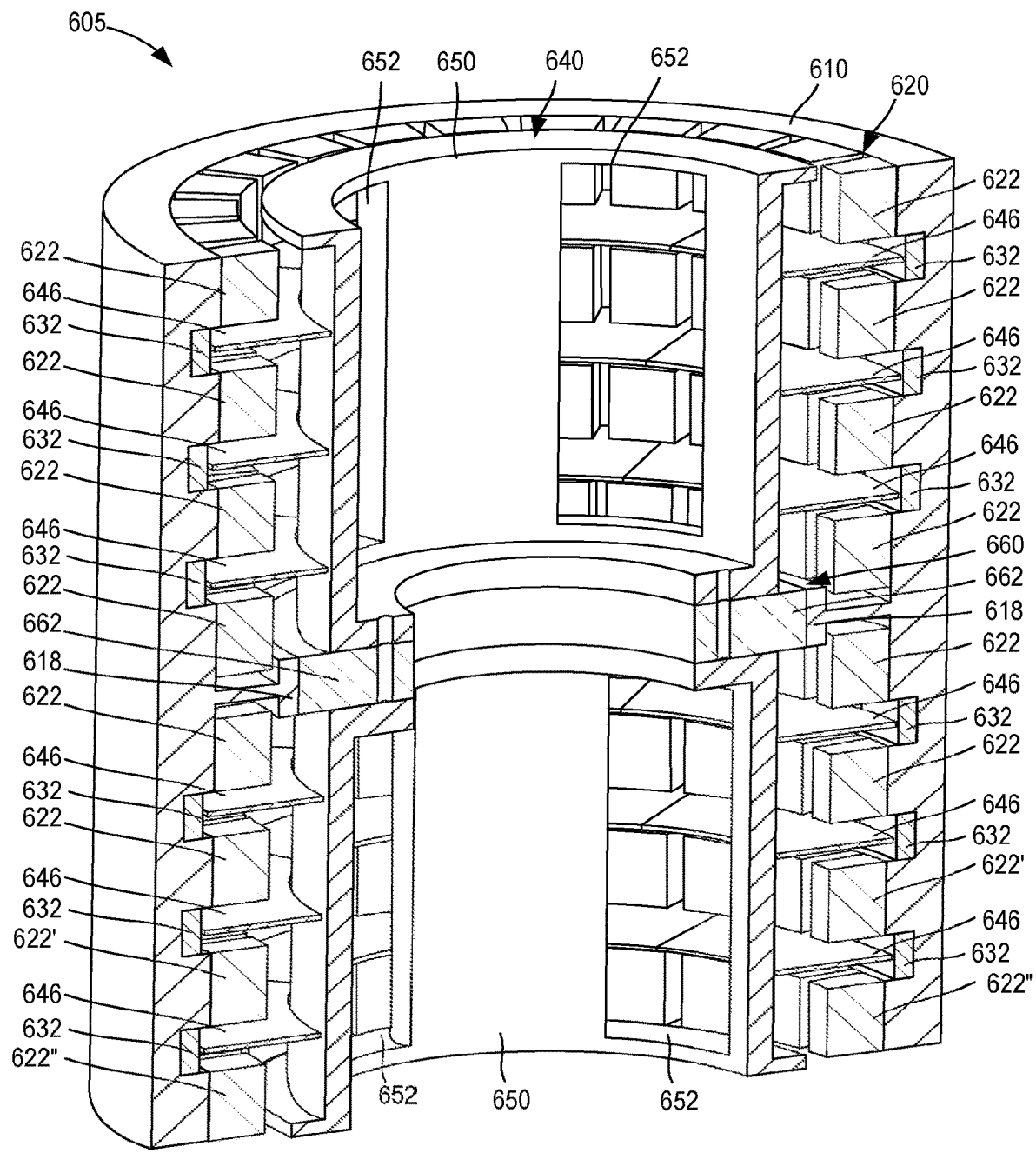
FIG. 6 is a cross-sectional perspective illustration of a flywheel according to another embodiment.

As shown in FIG. 6, the flywheel 605 includes at least a rotor 610 having a magnet assembly 620 and sets of mass loads 632, a stator 640 having a set of motor/generator portions 646, and a hub 660. The flywheel 605 and/or the components thereof can have any suitable arrangement and/or configuration. For example, as shown in FIG. 6, a portion of the flywheel 605 can form a motor/generator 630 configured as an axial flux permanent magnet machine. In such embodiments, the rotor 610 of the flywheel 605 can be rotated relative to the stator 640 such that magnetic flux associated with the rotation of permanent magnets included in the magnet assembly 620 induces a flow of electric current within the stator windings of the stator 640. Moreover, the flywheel 605 is arranged to store energy with a relatively high energy and power density, as described in further detail herein.

Figure 7:
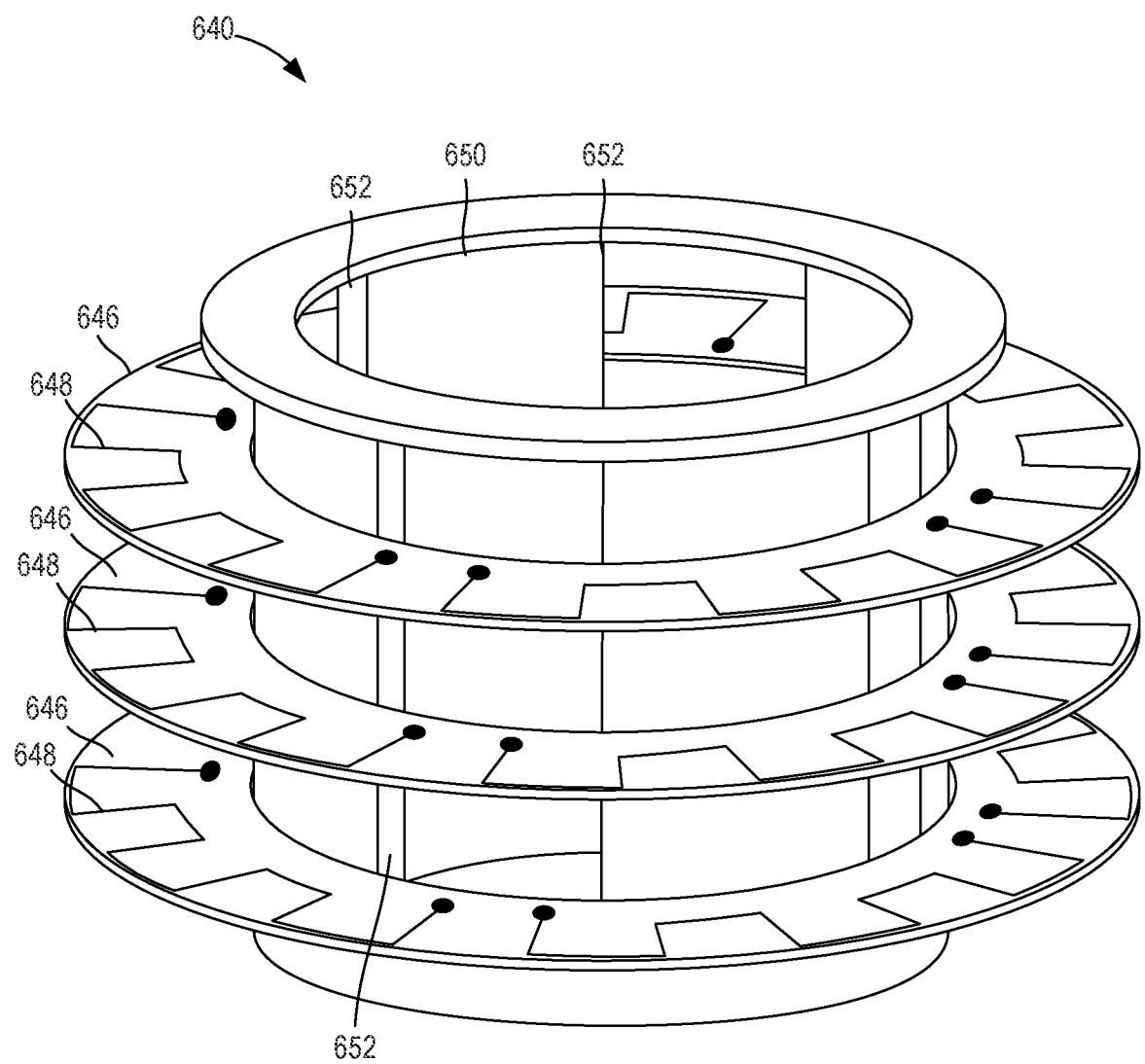
FIG. 7 is a perspective illustration of a stator assembly included in the electromagnetic machine structure of FIG. 6.
Figure 8:
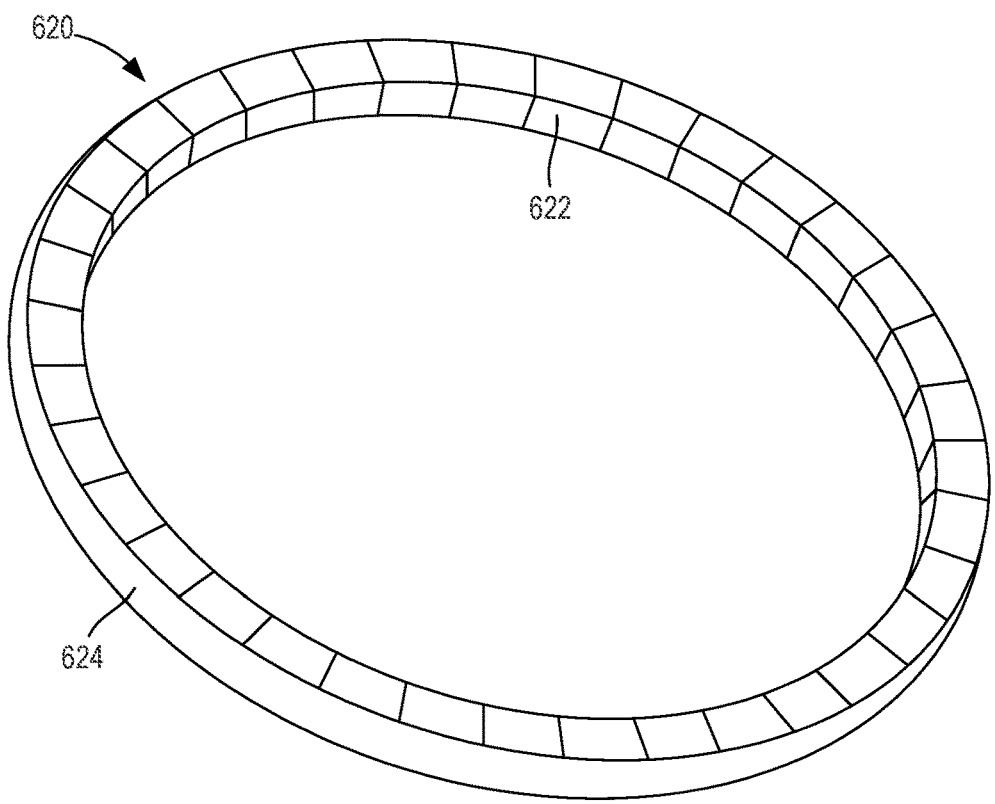
FIG. 8 is a perspective illustration of a portion of a magnet assembly configured to be disposed within the electromagnetic machine structure of FIG. 6.

As shown in FIGS. 6 and 7, the stator 640 has central structure 650 from which the motor/generator portions 646 extend. The central structure 650 (and thus, the stator 640) can have a substantially annular cross-sectional shape that can be associated with, for example, an inner surface of the rotor 610, thereby allowing the stator 640 to be disposed within the rotor 610. The central structure 650 defines a set of openings 652 configured to facilitate connecting the electrical wires to the stator coils, but also reduces the weight of the stator 640 as well as to allow access to portions of the flywheel 605 for serving, etc. The stator 640 is fixedly coupled to the hub 660, which is configured to maintain the stator 640 in a substantially fixed position while the rotor 610 rotates relative thereto.

As shown in FIG. 7, each motor/generator portion 646 extends from the central structure 652 of the stator 640. The motor/generator portions 646 can be substantially thin rings that include, for example, a set of stator windings 648 (or coils). In some embodiments, the stator windings 648 can be wound wires or the like. In other embodiments, the stator windings 648 can be electrically conductive traces on, for example, a printed circuit board. Although not shown in FIG. 7, the stator windings 648 can be electrically coupled to any suitable device, load, system, grid, etc. such that electric current can flow therebetween. As described in further detail herein, the motor/generator portions 646 are configured to interact with the magnet assembly 620 of the rotor 610 to collectively form the motor/generator 630 of the flywheel 605.

The rotor 610 has a substantially annular cross-sectional shape, as shown in FIG. 6. In other words, the rotor 610 has an inner surface, defining an inner radius of the rotor 610, and an outer surface, defining an outer radius of the rotor 610. The rotor 610 can be formed from composite materials such as those described above. While the rotor 610 is shown in FIG. 6 as including a single layer and/or is shown as being formed by a single composite material, in other embodiments, the rotor 610 can include any suitable number of layers, each of which can be formed of a different composite material. For example, in some embodiments, the rotor 610 can include three layers (e.g., a high-strength carbon composite outer layer, a glass/carbon composite middle layer, and a glass and/or glass composite inner layer, as described above with reference to the rotor 310 or the rotor 410. Moreover, the rotor 610 includes a bearing portion 618 configured to engage a bearing 662 of the hub 660. In some embodiments, the bearing 662 can be, for example, a static mechanical bearing such as a ball bearing or pin bearing. In other embodiments, the bearing 662 can be a magnetic levitation bearing, an active or a passive magnetic stabilization bearing, a gas bearing, and/or the like or a combination thereof. Thus, the hub 660 and bearing 662 support the rotor 610 (via at least the bearing portion 618) as the rotor 610 rotates relative to the hub 660 and stator 640.

The magnet assembly 620 is coupled to the inner surface of the rotor 610. The magnet assembly 620 can include any number of sets of magnets 622, each of which includes magnets that are circumferentially arranged along the inner surface of the rotor 610. The magnets in the sets of magnets 622 can be any suitable type of magnet such as those described herein. In some embodiments, each of the sets of circumferentially arranged magnets of the magnet assembly 620 can be in the form of a ring of magnets 622, as shown, for example, in FIG. 8. For example, in some embodiments, the magnets in each set of magnets 622 can be coupled to an annular ring 624 configured to secure the magnets and to fixedly couple the set of magnets 622 to the inner surface of the rotor 610.

Figure 9:
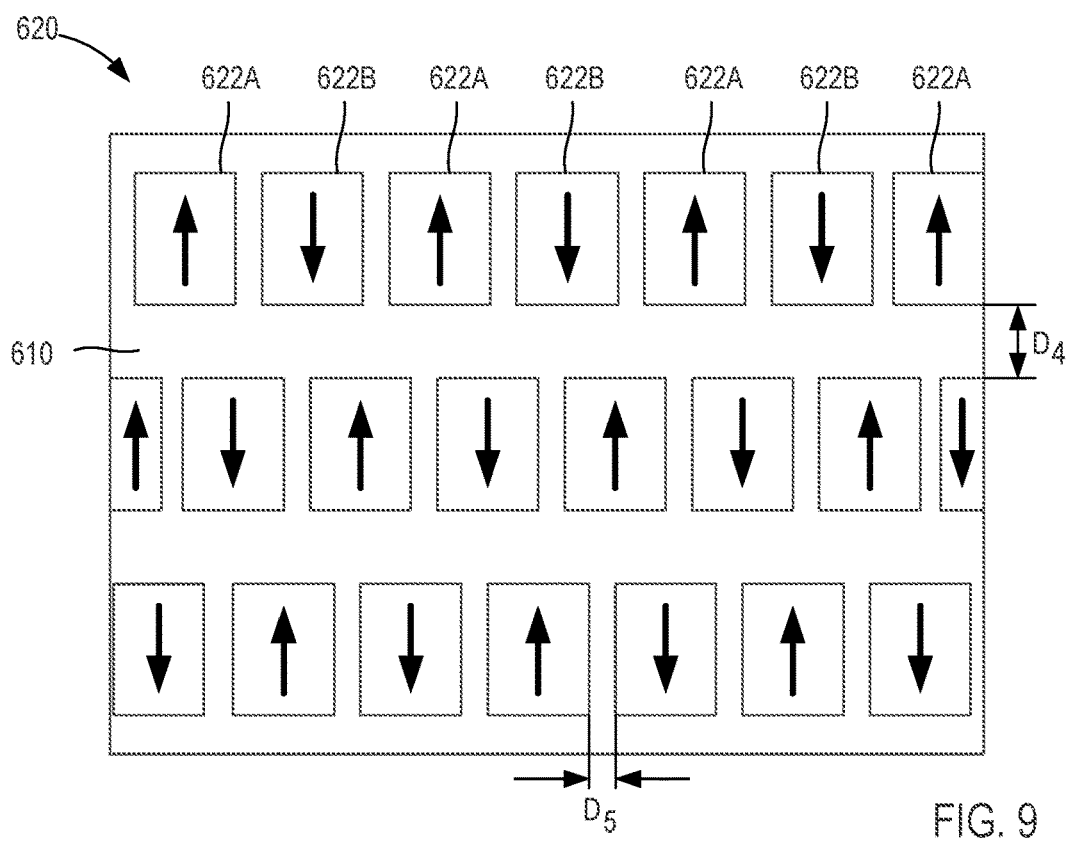
FIG. 9 is a schematic illustration of a portion of the magnet assembly of FIG. 7.

Each of the circumferentially arranged rings of magnets 622 can include any suitable number of segmented magnets. In some embodiments, segmenting the magnets can reduce stresses within and/or otherwise exerted by the magnets during rotation of the rotor 610 (e.g., shear stresses, through-thickness stresses, hoop stresses, and/or the like), as described above with reference to the rotor 110 (FIG. 1). As shown in FIGS. 6 and 9, each of the circumferential rings of magnets 622 can be disposed at or on a desired segment of the inner surface along a longitudinal axis of the rotor 610. For example, a first ring of magnets 622 can be disposed at a first position along the longitudinal axis, a second ring of magnets 622' can be disposed at a second position along the longitudinal axis different from the first position, a third ring of magnets 622" can be disposed at a third position along the longitudinal axis different from the first position and the second position, and so forth.

The magnets 622 and/or the circumferential rings of magnets 622 can be coupled to the inner surface of the rotor 610 in any suitable arrangement. For example, as shown in FIG. 9, the magnets 622 can be coupled to the inner surface of the rotor 610 such that each circumferential ring of magnets 622 is separated from its axially adjacent circumferential rings of magnets 622 by a distance $D_4$. Similarly, each magnet 622 (e.g., segmented magnet) included in a circumferential ring of magnets 622 is separated from its circumferentially adjacent magnets 622 by a distance $D_5$. As shown, the magnets can be arranged such that a magnet 622A having a polarity in a first direction is circumferentially adjacent to magnets 622B having a polarity in a second direction opposite the first direction (and vice versa). Thus, a magnetic flux can flow between and/or through the magnets 622A and 622B within a predetermined magnetic flux flow path.

As shown in FIG. 9, the circumferential rings of magnets 622 can be offset from their axially adjacent rings of magnets 622 by a predetermined angle. For example, each magnet 622A and 622B of the top ring of magnets is coupled to the rotor 610 at a circumferential position along the inner surface; each magnet 622A and 622B of the middle ring of magnets is coupled to the rotor 610 at a circumferential position along the inner surface that is offset from the magnets 622A and 622B of the top ring; and each magnet 622A and 622B of the bottom ring of magnets is coupled to the rotor 610 at a circumferential position along the inner surface that is offset from the magnets 622A and 622B of the top ring and the magnets 622A and 622B of the middle ring. In other embodiments, the magnets 622A and 622B need not be offset. In other words, the circumferential rings of magnets 622 can be distributed along the inner surface in the axial direction with substantially the same circumferential orientation.

Referring back to FIG. 6, the arrangement of the rotor 610 and the stator 640 is such that the motor/generator portion 646 of the stator 640 is disposed within the space defined between the axially adjacent rings of magnets 622 (e.g., the space having the distance $D_4$ in FIG. 9). The arrangement of the rings of magnets 622 of the rotor 610 and the motor/generator portions 646 of the stator 640 is such that a desired air gap is defined therebetween. More specifically, the arrangement of the motor/generator portion 646 of the stator 640 disposed between the rings of magnets 622 collectively form, for example, an axial flux permanent magnet motor/generator (e.g., the motor/generator 630). Thus, the flywheel 605 can be configured to receive a flow of electric current (e.g., via the stator windings 648) operative to rotate the rotor 610 relative to the stator 640 and/or can induce a flow of electric current within the stator windings 648, which can be delivered to a load, as described in detail above with reference to the flywheels 105, 205, 305, 405, and/or 505.

As shown in FIG. 6, the magnets 622 and/or rings of magnets of the rotor 610 and the motor/generator portions 646 of the stator are uniformly distributed along substantially the entire length of the flywheel 605 in the axial direction. Accordingly, the portion of the flywheel 605 configured as the motor/generator 630 is increased and/or substantially maximized. As such, the power density of the flywheel 605 is increased, i.e., the rate at which the electric energy can be transferred to and/or from the flywheel 605 (via the stator windings 648) is increased. For example, if a stator winding 648 has a maximum electric capacity (e.g., maximum voltage, current, and/or power that can be transferred along the stator winding 648 without failure), the electric power density associated with the flywheel 605 can be increased by increasing a number of stator windings 648 included therein. Thus, increasing a portion of the flywheel 605 configured as the motor/generator 630 can result in the flywheel 605 having a high power density.

As described above, the rotor 610 includes the sets of mass loads 632. The sets of mass loads 632 can be magnetic (e.g., the sets of mass loads 632 form at least a portion of the magnets 622 included in the magnet assembly 620) or can be inert (e.g., nonmagnetic) and distinct from the sets or rings of magnets 622 included in the magnet assembly 620. In this embodiment, the mass loads 632 are formed from stainless steel, tungsten alloy, metal loaded polymers, and/or other nonmagnetic material. In some embodiments, the mass loads 632 are segmented into structurally discrete segments, and may be arranged such that a desired distance is defined between adjacent magnets—in either a circumferential direction or an axial direction. By segmenting the mass loads 632, the stresses exerted on and/or in the mass loads 632 resulting from the centrifugal effects can be reduced, as described above with reference to the flywheels 105, 205, 305, 405, and/or 505.

As shown in FIG. 6, the sets of mass loads 632 are disposed within the spaces defined between the axially adjacent rings or sets of magnets 622 (the space having the distance $D_4$ in FIG. 9). In some embodiments, each of the mass loads 632 can have a mass that is substantially equal to a mass of each of the magnets in the magnet assembly 620. Expanding further, a mass of each mass load 632 can be associated with and/or dependent on its position along the radius of the rotor 610 (e.g., a mean radius of the mass). For example, when the sets of mass loads 632 and the sets of magnets 622, 622', and 622" of the magnet assembly 620 cover the inner surface of the rotor 610 substantially in its entirety and have a substantially similar radial position (i.e., mean radius), the sets of mass loads 632 and sets of magnets 622, 622', and 622" of the magnet assembly 620 can have substantially the same mass. Thus, the mass loads 632 and magnets can exert a substantially uniform pressure on the inner surface of the rotor 610 as the rotor 610 rotates about its axis.

In other embodiments, each of the mass loads 632 can have a mass that is not equal to a mass of each of the magnets in the magnet assembly 620, while nonetheless, collectively exerting the substantially uniform pressure on the inner surface of the rotor 610 as the rotor 610 rotates about its axis. For example, each of the mass loads 632 can have a smaller radial thickness or size than each of the magnets and thus, each of the mass loads 632 can have a greater mean radius than a mean radius associated with each of the magnets included in the magnet assembly 620. In such embodiments, each mass load 632 can have a density that is greater than a density of each of the magnets 622, 622', and/or 622" and thus, while having the smaller size (radial thickness), the mass loads 632 and the magnets can exert a substantially uniform pressure loading on the rotor 610. In this manner, each of the sets of mass loads 632 can be disposed between the rotor 610 and a circumferential end surface of the corresponding one of the stator portions 646 while maintaining a desired air gap therebetween. Thus, the arrangement of the sets of mass loads 632 and the magnet assembly 620 on the inner surface of the rotor 610 results in a stress state associated with the rotation of the rotor 610 that is different from the stress state otherwise associated with rotation of the rotor 610 without the mass loads 632. As a result, the rotational velocity of the rotor 610 can be increased, which in turn, increases the energy and power density associated with the flywheel 605, as described in detail above with reference to at least the flywheels 105 (FIG. 1) and/or 205 (FIG. 2).

Figure 10:
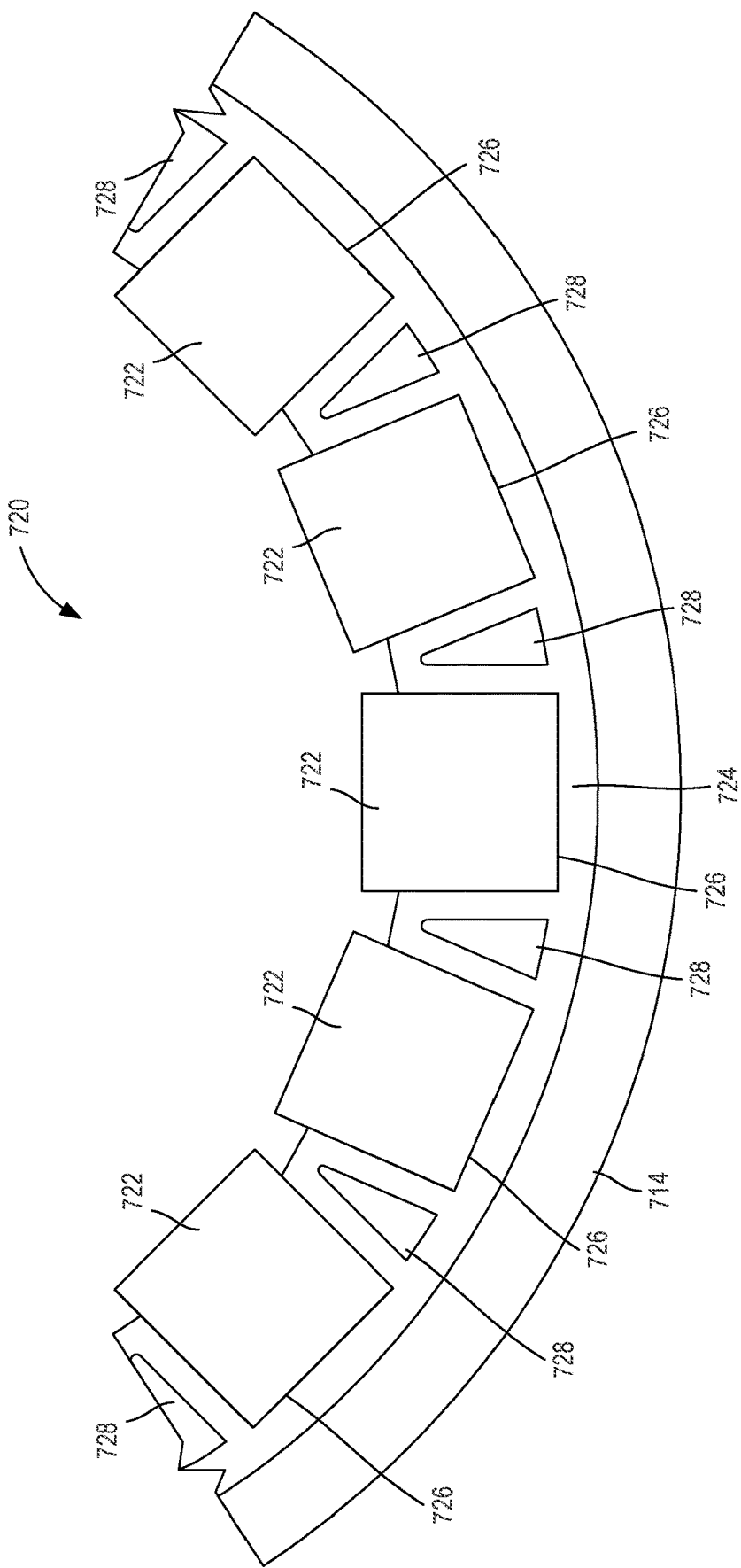
FIG. 10 is a schematic illustration of a portion of a magnetic assembly according to an embodiment.

While the magnets 622 are shown and described above as being coupled to the rotor 610 via the annular ring 624, in other embodiments, magnets can be coupled to a rotor via a magnet retention ring having any suitable configuration. For example, FIG. 10 is a schematic view of a portion of a magnet assembly 720 according to an embodiment. The magnet assembly 720 can be included in and/or coupled to any suitable rotor or the like such as the rotors 110, 210, 310, 410, 510, and/or 610 described herein. In some embodiments, the magnet assembly 720 can be coupled to, for example, a composite layer 714 of a rotor (e.g., a carbon composite layer, a glass/carbon composite layer, and/or a glass composite layer, as described above with reference to the rotors 310 (FIG. 3) and 410 (FIG. 4).

As shown in FIG. 10, the magnet assembly 720 includes a magnet retention ring 724 and a set of magnets 722 coupled thereto. The magnets 722 can be any suitable magnets such as those described herein. The magnet retention ring 724 defines a set of notches 726 and a set of openings 728. The notches 726 are configured to receive a portion of the magnets 722 to fixedly couple the magnets to the magnet retention ring 724. For example, in some embodiments, the magnets 722 can be pressed into the notches 726 and secured therein via an adhesive, a friction fit, a mechanical fastener, a welded or sintered joint, and/or the like.

The openings 728 are configured to allow the magnet retention ring 724 to deform when placed under a load. For example, in some embodiments, the magnetic retention ring 724 can deform as the magnets 722 are pressed into the openings 726. In some embodiments, the forces exerted on the magnet retention ring 724 due to the centrifugal effect associated with the rotation of a rotor can be sufficient to deform a portion of the magnet retention ring 724. While the magnet retention ring 724 is shown as defining the openings 728, in other embodiments, the magnet retention ring 724 can define a slot, a notch, a groove, a channel, and/or any other suitable discontinuity configured to allow the magnet retention ring 724 to expand and/or to otherwise redistribute an amount of stress within the magnet retention ring 724 during loading.

The magnet retention ring 724 can be formed of a relatively compliant metal, metal alloy, composite, and/or the like, with a relatively low modulus of elasticity. As such, a portion of the magnet retention ring 724 can be configured to elastically (e.g., nonpermanently) expand in response to the stresses associated with the rotation of a rotor such as, for example, radial stress and hoop stress. In some embodiments, the expansion of the magnet retention ring 724 can result in a uniform distribution of the individual forces exerted by each magnet 722. Thus, by expanding, the magnet retention ring 724 can exert a uniform force on an inner surface of the composite layer 714 of a rotor as the rotor is rotated about an axis. Moreover, by disposing the magnets 722 in the notches 726 of the magnet retention ring 724, the shear stress associated with the magnets 722 in response to angular acceleration/deceleration that would otherwise act to shear (e.g., decouple) the magnets 722 from the inner surface of the rotor is supported by the magnet retention ring 724. By monolithically forming the magnet retention ring 724, a surface area of the magnet retention ring 724 in contact with and coupled to the inner surface of the rotor can provide a greater surface area over which the acceleration loads on the magnets 722 can be carried by the inner surface of the rotor, i.e. reduce the magnitude of the shear stress for a given angular acceleration. As a result, changes in the rate of angular acceleration/deceleration of the rotor can be increased, which in turn, can increase a rate at which energy can be transferred to or from a flywheel within which such a rotor is disposed (i.e., increase a power density of the flywheel).

Figure 11:
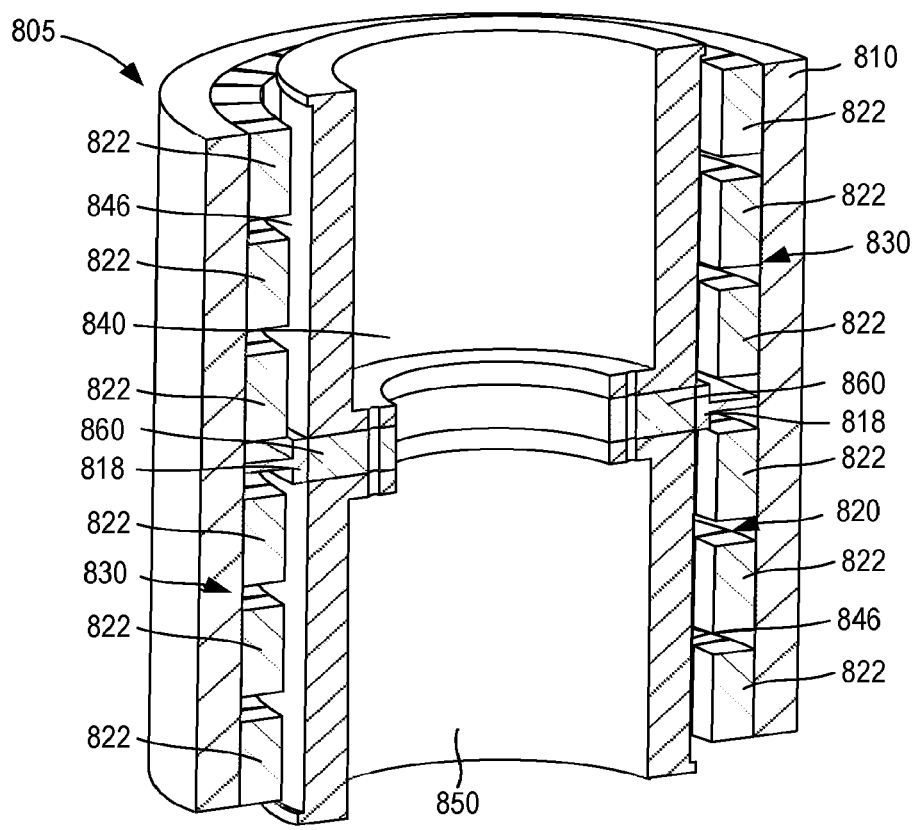
FIG. 11 is a cross-sectional perspective illustration of a flywheel according to another embodiment.
Figure 12:
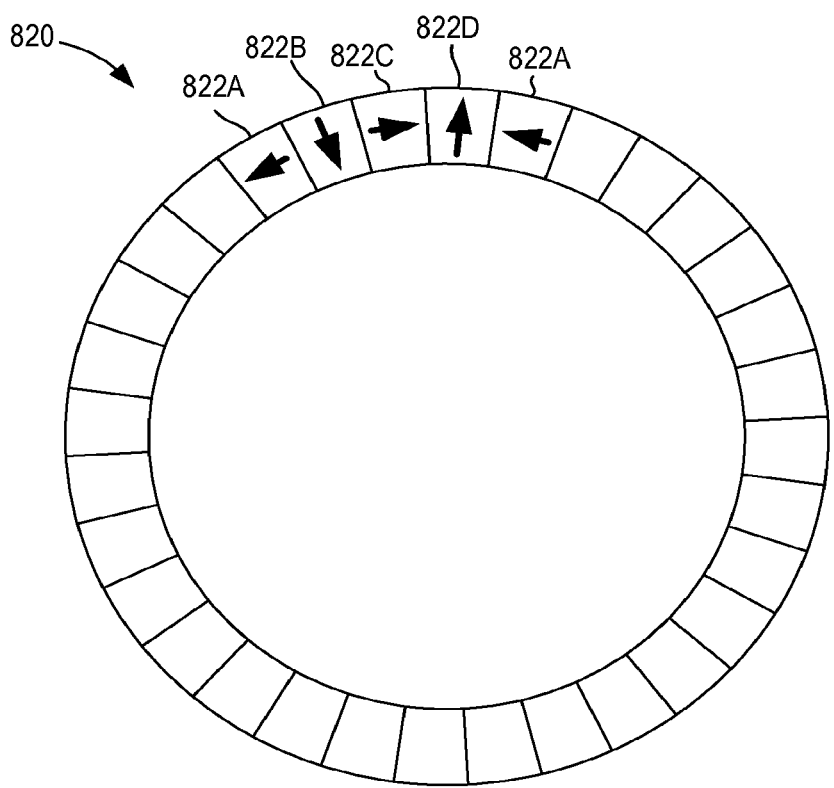
FIG. 12 is a top view of a portion of a magnet assembly configured to be disposed within the electromagnetic machine structure of FIG. 11.

While the flywheels 205, 305, 405, 505, and 605 have been shown and described as being an axial flux permanent magnet machine, in other embodiments, a flywheel configured to have a relatively high-energy storage density and/or a relatively high power density based at least in part on mass loading can be any suitable type of electromagnetic machine. For example, FIGS. 11 and 12 illustrate a flywheel 805 according to an embodiment. The flywheel 805 can be substantially similar to the flywheels 105, 205, 305, 405, 505, and/or 605 described herein in at least function. Thus, portions of the flywheel 805 are not described in further detail herein.

As shown in FIG. 11, the flywheel 805 includes at least a rotor 810 having a magnet assembly 820, a stator 840 having a set of motor/generator portions 846, and a hub 860. The stator 840 has central structure 850 configured to couple the stator 840 to the hub 860. While the stator 640 is shown and described as having the motor/generator portions 646 extending radially from the central structure 650, in the embodiment shown in FIGS. 11 and 12 the motor/generator portions 846 are arranged along a circumference of the central structure 850. Thus, the stator 840 is configured for use in a radial flux electromagnetic machine. As described above with reference to the stator 640, the motor/generator portions 846 of the stator 840 can include stator windings such as, for example, wound wires or coils, electrically conductive traces, and/or the like. As described in further detail herein, the motor/generator portions 846 are configured to interact with the magnet assembly 820 of the rotor 810 to collectively form a motor/generator 830 of the flywheel 805.

The rotor 810 has a substantially annular cross-sectional shape with an inner surface and an outer surface. The rotor 810 can be formed from composite materials such as those described above. While the rotor 810 is shown in FIG. 11 as including a single layer and/or is shown as being formed by a single composite material, in other embodiments, the rotor 810 can include any suitable number of layers, which can each be formed of a different composite material. For example, in some embodiment, the rotor 810 can include three layers (e.g., a high-strength carbon composite outer layer, a glass/carbon composite middle layer, and a glass and/or glass composite inner layer, as described above with reference to the rotor 310 or the rotor 410. Moreover, the rotor 810 includes a bearing portion 818 configured to engage a bearing coupled to the hub 860. As such, the hub 860 rotatably supports the rotor 810 (via at least the bearing portion 818) as the rotor 810 rotates relative to the hub 860 and stator 840, as described above with reference to the flywheel 605.

The magnet assembly 820 is coupled to the inner surface of the rotor 810. The magnet assembly 820 can include any number of magnets 822 that are circumferentially arranged along the inner surface of the rotor 810. The magnets 822 can be any suitable type of magnet such as those described herein. In some embodiments, the circumferentially arranged magnets of the magnet assembly 820 can form a ring of magnets 822, as shown, for example, in FIG. 8. For example, in some embodiments, the magnets 822 can be coupled to magnet retention ring (not shown) configured to secure the magnets 822 and to fixedly couple the magnets 822 to the inner surface of the rotor 810 (e.g., similar to the magnet retention ring 724 of FIG. 10).

Each of the circumferentially arranged rings of magnets 822 can be any suitable number of segmented magnets 822. In some embodiments, segmenting the magnets 822 can reduce stresses within and/or otherwise exerted by the magnets during rotation of the rotor 810 (e.g., shear stresses, through-thickness stresses, hoop stresses, and/or the like), as described above with reference to the rotor 110 (FIG. 1). As shown in FIG. 11, the circumferential rings of magnets 822 can be disposed at or on a desired segment of the inner surface along a longitudinal axis of the rotor 810 such that a circumferential ring of magnets 822 is substantially aligned with a motor/generator portion 846 of the stator 840.

As shown in FIG. 12, the magnets can be arranged such that each magnet has a polarity aligned in a desired direction. For example, a first magnet 822A has a polarity in a first circumferential direction; a second magnet 822B is adjacent to the first magnet 822A and has a polarity in a first radial direction; a third magnet 822C is adjacent to the second magnet 822B and has a polarity in a second circumferential direction opposite the first circumferential direction; and a fourth magnet 822D is adjacent to the third magnet 822C and has a polarity in a second radial direction opposite the first radial direction. The circumferential ring of magnets 822 can include any number of magnets arranged with the same pattern of polarity. Thus, magnetic flux can flow between and/or through the magnets 822A, 822B, 822C, and 822D within a predetermined magnetic flux flow path. For example, in the embodiment shown in FIG. 12, the magnets 822 can be arranged in a Halbach array or the like configured to direct a flow of magnetic flux, for example, in a radially inward direction while minimizing a flow of magnetic flux in a radially outward direction. This arrangement can obviate the need for a back iron or the like otherwise configured to define a magnetic flux return path. As such, the magnetic flux flowing between and/or through the magnets 822 can interact with the motor/generator portion 846 of the stator 840 to produce an electromagnetic force operative to rotate the rotor 810 relative to the stator 840 or to induce a flow of electric current within the motor/generator portion 846 of the stator 840.

Although not shown in FIG. 11, the rotor 810 can include a set of mass loads. The mass loads can be magnetic (e.g., the mass loads form at least a portion of the magnets 822 included in the magnet assembly 820) or can be inert (e.g., nonmagnetic) and distinct from the magnets 822 included in the magnet assembly 820. In some embodiments, the mass loads are segmented such that a desired distance is defined between adjacent magnets—in either a circumferential direction or an axial direction. By segmenting the mass loads, the stresses exerted on and/or in the mass loads resulting from the centrifugal effects can be reduced, as described above with reference to the flywheels 105, 205, 305, 405, and/or 505.

As described above, the mass loads can be disposed within the space defined between the axially adjacent magnets 822. In some embodiments, each of the mass loads can have a mass that is substantially equal to a mass of each of the magnets in the magnet assembly 820 and thus, the mass loads and the magnets of the magnet assembly 820 can exert a substantially uniform pressure on an inner surface of the rotor 810. In other embodiments, a mass and a mean radius of each mass load can be different from a mass and a mean radius of each of the magnets in the magnet assembly 820. In other words, the mass loads can have a mass and radial thickness that is different from a mass and radial thickness of each of the magnets in the magnet assembly 820. Therefore, in such embodiments, a substantially uniform pressure can be exerted on the inner surface of the rotor 810 by "tuning" and/or matching, for example, a product of the density, the radial thickness, and the local acceleration (where the local acceleration is equal to the product of the mean radius of the mass and the square of the rotational rate) or the of masses and of the magnets. Thus, when the mass loads and the magnets 822 of the magnet assembly 820 cover the inner surface of the rotor 810 substantially in its entirety, the mass loads and magnets 822 of the magnet assembly 820 exert a substantially uniform pressure on the inner surface of the rotor 810 as the rotor 810 rotates about its axis. The arrangement of the mass loads and the magnet assembly 820 on the inner surface of the rotor 810 results in a stress state associated with the rotation of the rotor 810 that is different from the stress state otherwise associated with rotation of the rotor 810 without the mass loads. As a result, the rotational velocity of the rotor 810 can be increased, which in turn, increases an energy density associated with the flywheel 805, as described in detail above with reference to at least the flywheels 105 (FIG. 1) and/or 205 (FIG. 2).

Analysis and Results

As described above with reference to the specific embodiments, a flywheel energy storage device and/or system can include a rotor configured to rotate relative to a stator. The rotor of the flywheel can be, for example, an annular cylinder considered as having a thin wall. The stresses within the rotor can be evaluated by considering the stress-strain relationships in the axial, radial, and tangential (hoop) direction. By evaluating at a given position along the rotational axis (e.g., assuming a unit axial thickness), the hoop stress and the radial stress at that given position can be equated in terms of their stress-strain relationships, represented by Equation 3 below:

$$0 = (\sigma_h - \sigma_r)(1+v) + r\left(\frac{d\sigma_h}{dr} - v\frac{d\sigma_r}{dr}\right) \quad \text{Equation 3}$$

where $\sigma_r$ is the radial stress, $\sigma_h$ is the hoop stress (also known as the "circumferential tensile stress" or "tangential stress"), and v is Poisson's Ratio.

In use, the rotor of the flywheel rotates about its axis. The centrifugal effect associated with rotation produces a pressure on the walls of the rotor, which can be evaluated, assuming unit axial thickness, in terms of the hoop stress and the radial stress, as represented by Equation 4 below:

$$\sigma_h - \sigma_r = \rho r^2 \omega^2 + r\frac{d\sigma_r}{dr} \quad \text{Equation 4}$$

where ρ is the density of the material (e.g., density of the carbon composite material forming the rotor), r is the radius of the rotor, and ω is the rotational velocity.

By substituting Equation 4 into Equation 3 (and integrating, substituting, and simplifying), the radial stress and the hoop stress exerted on or in the rotor can be solved for as independent functions. Moreover, by considering the boundary conditions of the rotor at an inner radius and an outer radius as equaling zero, the radial stress and the hoop stress exerted on or in the rotor can be expressed as two separate functions of a given radius and given rotational velocity, as represented, respectively, by Equations 5 and 6 below:

$$\sigma_r = \frac{(3+v)}{8}\rho\omega^2\left[R_i^2 + R_o^2 - \frac{R_i^2 R_o^2}{r^2} - r^2\right] \quad \text{Equation 5}$$

$$\sigma_h = \frac{(3+v)}{8}\rho\omega^2\left[R_i^2 + R_o^2 + \frac{R_i^2 R_o^2}{r^2} - \frac{(1+3v)}{(3+v)}r^2\right] \quad \text{Equation 6}$$

where $R_i$ is the inner radius of the rotor and $R_o$ is the outer radius of the rotor.

As described above, in some embodiments, a flywheel can include a rotor having any suitable number of discrete masses configured to exert a force on an inner surface (i.e., inner radius) of the rotor as the rotor rotates about its axis. In some embodiments, the arrangement of the masses is such that a substantially uniform pressure is exerted on the inner surface of the rotor. The stress distribution resulting from the pressure associated with the mass loading produces, for example, a radial stress and a hoop stress on or in the rotor as a function of the pressure. The hoop stress resulting from the pressure produced by the mass loading can be equated to the hoop stress resulting from the rotational velocity of the rotor and thus, by substitution the radial stress and the hoop stress resulting from the mass loading can be represented as a function of the rotational velocity and the radius of the rotor, as shown, respectively, by Equations 7 and 8 below:

$$\sigma_r = -\rho_m r_m t \omega^2 \frac{R_i^2}{R_o^2 - R_i^2}\left(1 - \frac{R_o^2}{r^2}\right) \quad \text{Equation 7}$$

$$\sigma_h = \rho_m r_m t \omega^2 \frac{R_i^2}{R_o^2 - R_i^2}\left(1 + \frac{R_o^2}{r^2}\right) \quad \text{Equation 8}$$

where $\rho_m$ is the density of each discrete mass, $r_m$ is the mean radius of the discrete mass, t is the thickness of the discrete mass, $\omega$ is the rotational velocity of the rotor, r is a given radius of the rotor, $R_i$ is the inner radius of the rotor, and $R_o$ is the outer radius of the rotor.

The effective pressure that a discrete mass exerts on the rotor, therefore, is represented by the leading terms in Equation 7 and 8, in which the effective mass loading pressure is equal to $\sigma_m r_m t \omega^2$. As described above, the effective mass loading pressure exerted by each mass and by each magnet can be matched and/or uniformly distributed in a flywheel system such that a substantially uniform pressure acts on the inner surface of the composite rotor.

As shown by Equations 7 and 8, mass loading the inner surface of the rotor can alter the stress state within a composite rotor as it rotates. In some instances, the mass loading of the composite rotor can result in placing the composite rotor under radial compression rather than the radial tension otherwise resulting from centrifugal effects of rotation. Composite materials such as carbon fiber composites typically have very high hoop stress failure limits and much lower radial stress failure limits. Thus, composite rotors generally fail due to radial stress. By mass loading the composite rotor, however, the composite rotor can be placed in radial compression, which has a higher radial stress failure limit when compared to its failure limit under radial tension (e.g., up to 20 times higher or more). Therefore, by placing the composite rotor under radial compression the angular velocity associated with the rotation of the rotor can be increased, which in turn, results in an increase in energy and power storage density of the flywheel.

For example, FIGS. 13-16 illustrate graphs showing a stress state of a carbon composite rotor with mass loading and without mass loading. In these embodiments, the carbon composite can have a tensile radial stress failure limit of about 5,000 pounds per square inch (psi) and a tangential (hoop) stress failure limit of about 400,000 psi. The rotor, in these examples, has an inner radius of 7.5 inches (in.) and an outer radius of 12 in.

Figure 13:
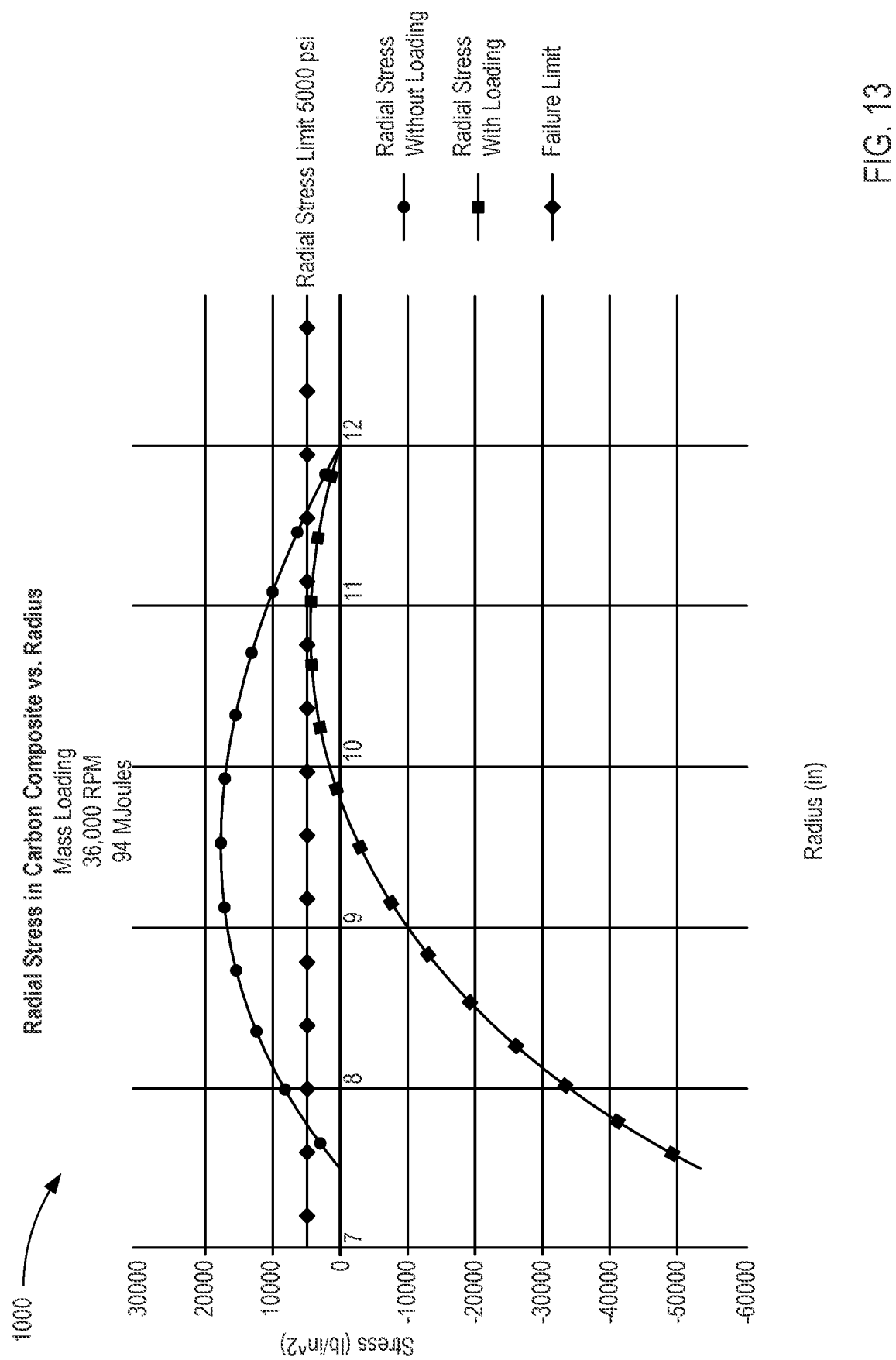
FIGS. 13-16 are graphs each illustrating a relationship between an amount of stress experienced by and a radius associated with an electromagnetic machine structure under a different condition.

FIG. 13, for example, is a graph 1000 illustrating a radial stress in the carbon composite rotor as a function of the rotor's radius (e.g., between the inner radius of 7.5 in. and the outer radius of 12 in.). As shown, the radial stress within composite rotor, when mass loaded and when rotating at 36,000 revolutions per minute (rpm), remains under the 5,000 psi radial stress failure limit at each radial position between the inner radius and the outer radius of the rotor. Conversely, the radial stress within the same composite rotor without mass loading and when rotating at the same 36,000 rpm exceeds the 5,000 psi failure limit between about 7.75 in. and about 11.5 in. This is consistent with the assumption that the rotor does not experience stress at the boundary conditions (e.g., 7.5 in. inner radius and 12 in. outer radius. As shown, by mass loading the composite rotor, the flywheel can produce or store about 94 MegaJoules (MJ) of energy when rotating the composite rotor at about 36,000 rpm.

Figure 14:
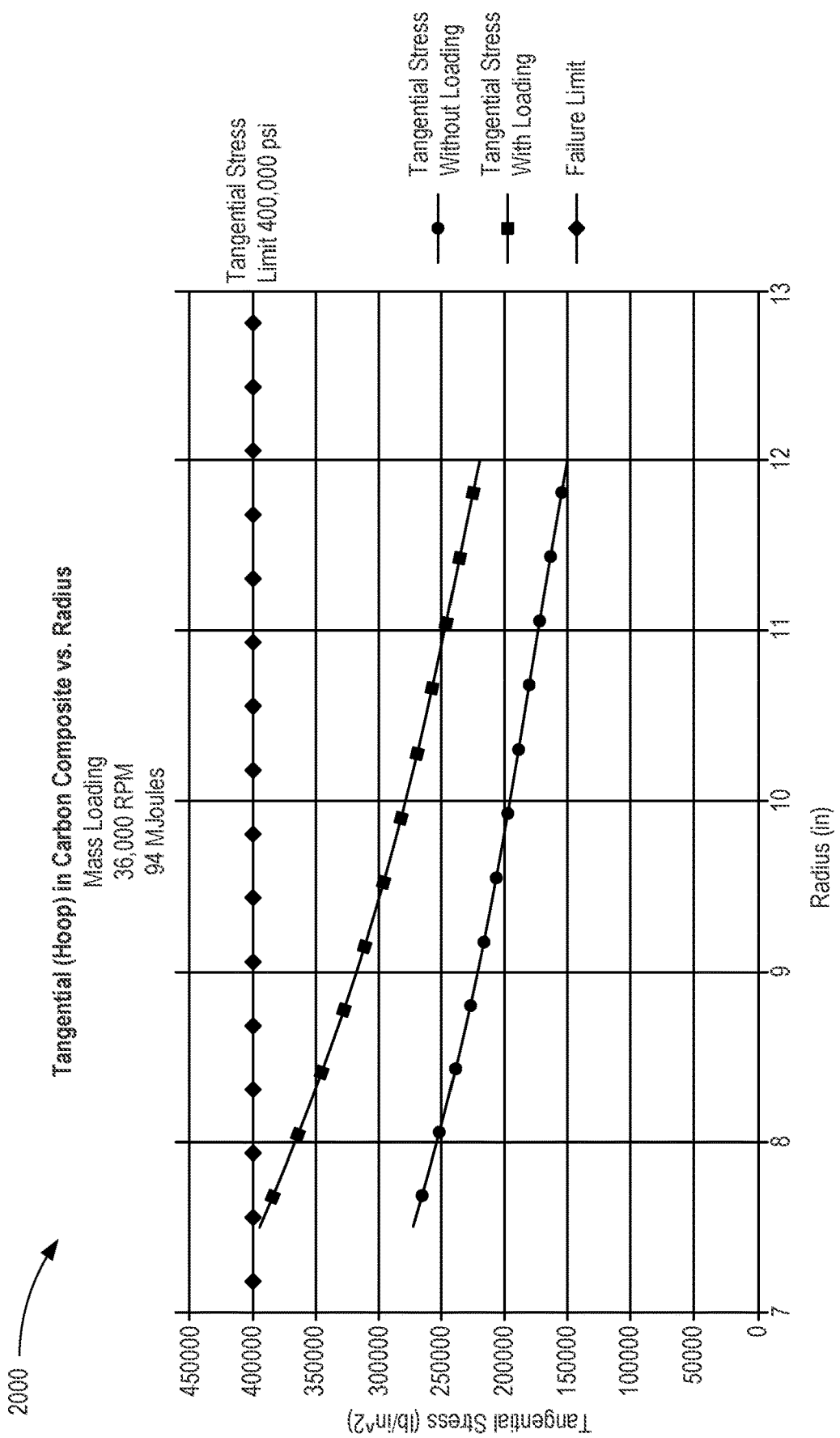

FIG. 14 is a graph 2000 illustrating a tangential (hoop) stress in the carbon composite rotor as a function of the rotor's radius. Again, the rotor is rotated with a rotational velocity of about 36,000 rpm. As shown, the tangential stress is increased by mass loading the composite rotor; however, the tangential stress remains below the 400,000 psi tangential stress failure limit for each radial position between the inner radius and the outer radius of the rotor.

Figure 15:
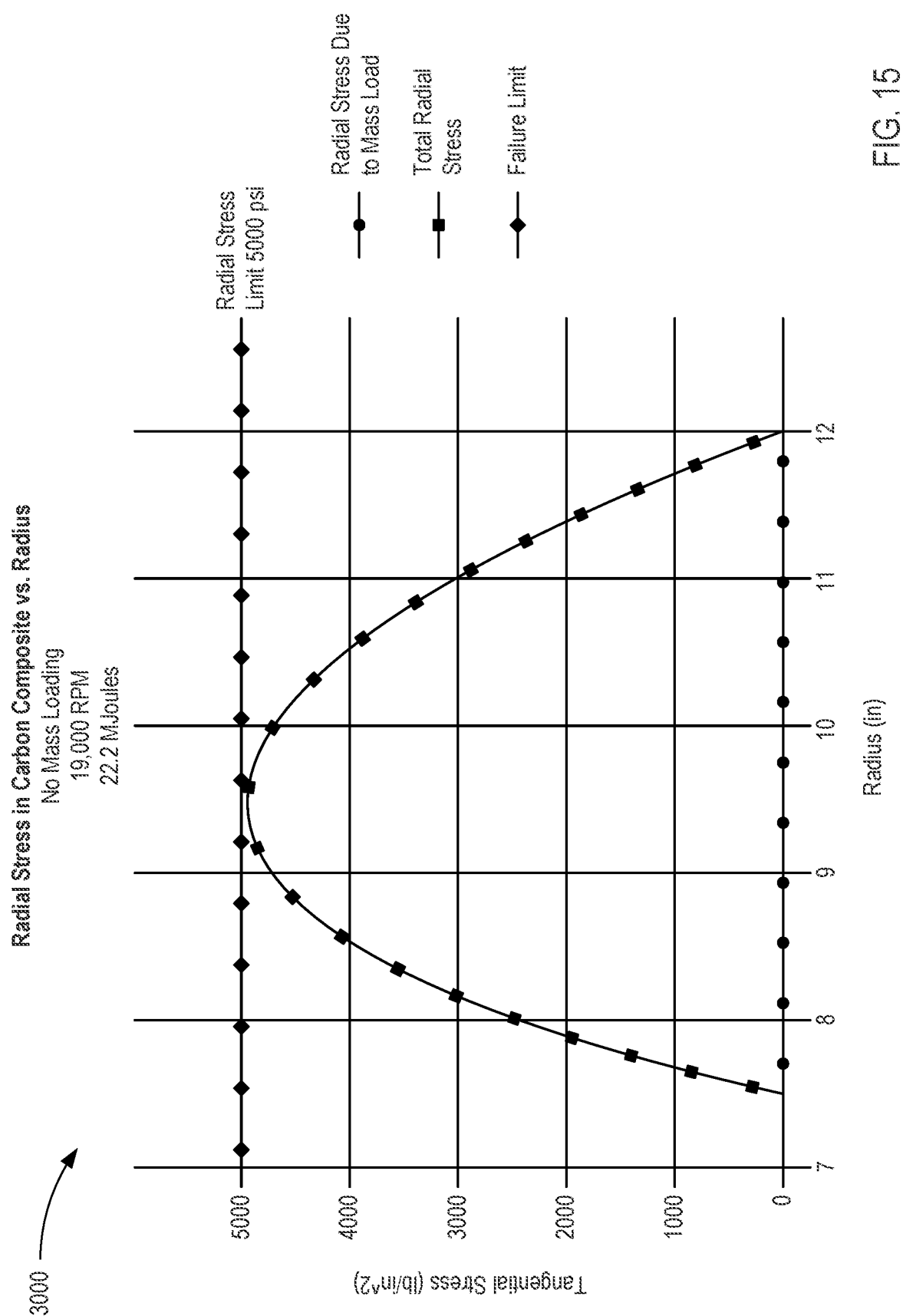

FIG. 15 is a graph 3000 illustrating a radial stress in a carbon composite rotor as a function of the rotor's radius without mass loading the composite rotor. As shown, the radial stress within the composite rotor without mass loading and when rotating at 19,000 revolutions per minute (rpm) remains under the 5,000 psi radial stress failure limit at each radial position between the inner radius and the outer radius of the rotor. More specifically, the radial stress approaches the 5,000 psi limit at about the center of the rotor. Thus, without mass loading, the composite rotor approaches the 5,000 psi radial stress limit at 19,000 rpm compared to 36,000 rpm when mass loaded. As a result, the flywheel, when rotated at 19,000 rpm, can produce or store only about 22.2 MJ of energy.

Figure 16:
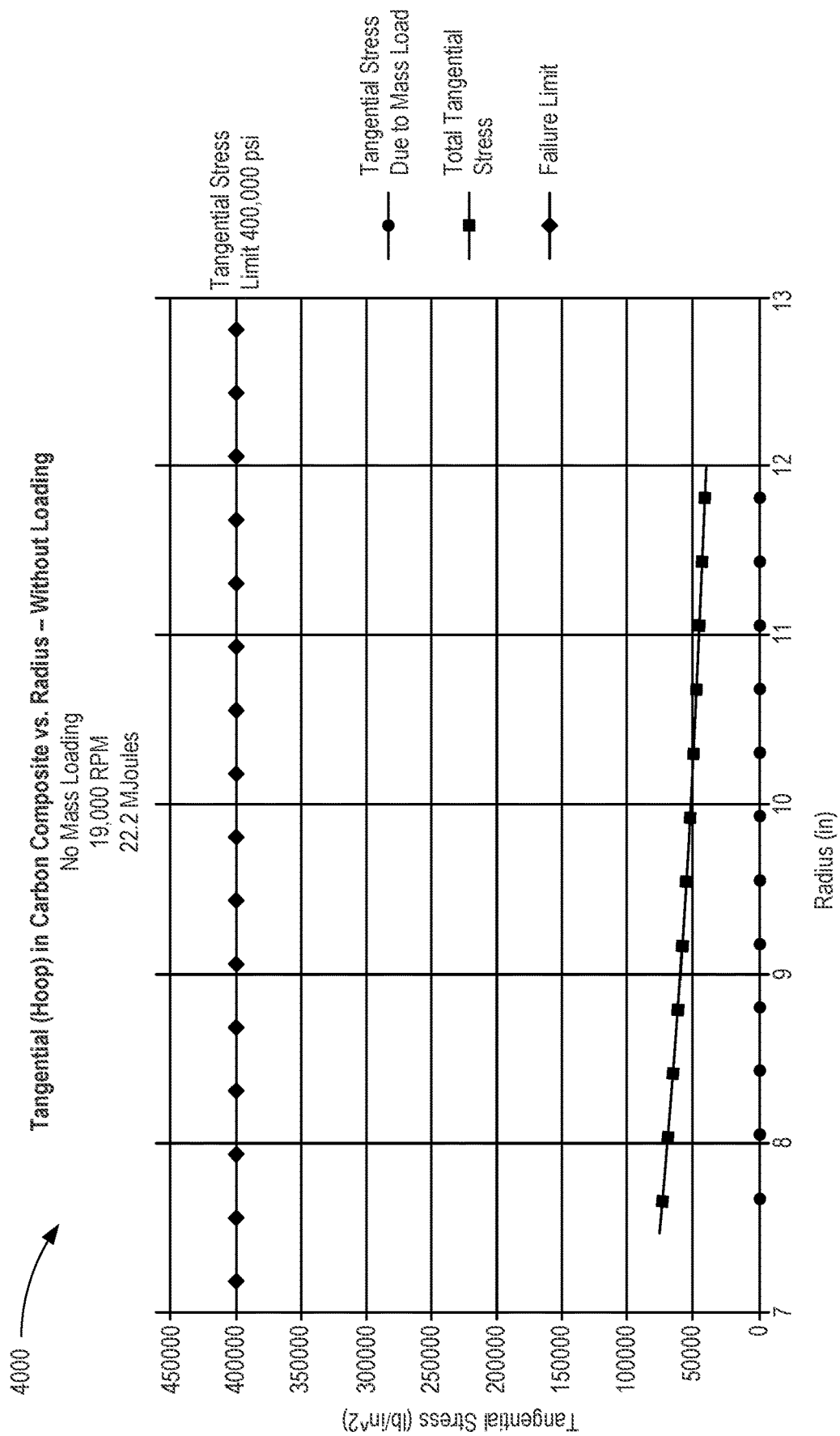

FIG. 16 is a graph 4000 illustrating a tangential (hoop) stress in the carbon composite rotor as a function of the rotor's radius without mass loading the composite rotor. Again, the rotor is rotated with a rotational velocity of about 19,000 rpm. As shown, the tangential stress within the composite rotor remains far below the 400,000 psi tangential stress failure limit for each radial position between the inner radius and the outer radius of the rotor. More specifically, the maximum tangential stress remains below 100,000 psi, thus the rotor is gains little benefit from the high strength of the composite rotor in the tangential direction. Accordingly, as shown in FIGS. 13-16, mass loading a composite rotor can allow the rotor to be rotated at higher velocities, which in turn, results in a higher energy storage density when compared to a non-mass loaded composite rotor.

While various embodiments have been described above, it should be understood that they have been presented by way of example only, not limitation, and various changes in form and details may be made. Where schematics and/or embodiments described above indicate certain components arranged in certain orientations or positions, the arrangement of components may be modified. While the embodiments have been particularly shown and described, it will be understood that various changes in form and details may be made.

Any portion of the apparatus and/or methods described herein may be combined in any combination, except mutually exclusive combinations. The embodiments described herein can include various combinations and/or sub-combinations of the functions, components and/or features of the different embodiments described. For example, a structure for an electromagnetic machine can include a different quantity and/or combination of magnets, masses, stator portions, etc. than shown with reference to specific embodiments.

In addition, it should be understood that the features, components and methods described herein for each of the various embodiments can be implemented in a variety of different types of electromagnetic machines, such as, for example, axial and radial machines that can support rotational movement of a rotor assembly relative to a stator assembly.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed is:

1. An apparatus, comprising:
   a hollow cylindrical flywheel for a motor/generator,
   the flywheel being formed of a composite material including a matrix material and fibers oriented at least in part in a circumferential direction around the flywheel embedded in the matrix material,
   the flywheel having a longitudinal axis of rotation, a radially inner surface, a radially outer surface, and a radial thickness between the inner surface and the outer surface,
   rotation of the flywheel about the axis of rotation generating hoop stress in the fibers in the circumferential direction and through-thickness stress in the matrix material in a radial direction, the material properties of the fibers and the matrix material being such that structural failure in response to rotation of the flywheel about the axis of rotation at a first rotational velocity produces failure of the matrix material in the radial direction and not failure of the fibers in the circumferential direction; and
   a plurality of load masses distributed circumferentially around, and coupled to, the inner surface of the flywheel at a longitudinal segment along the axis of rotation, each load mass from the plurality of load masses formed of an inert material,
   rotation of the flywheel causing each load mass from the plurality of load masses to produce a radially outwardly directed force on the inner surface of the flywheel, the radially outwardly directed force acting to reduce a maximum through-thickness stress in the matrix material such that structural failure in response to rotation of the flywheel about the axis of rotation at a second rotational velocity greater than the first rotational velocity produces failure of the fibers in the circumferential direction and not failure of the matrix material in the radial direction.

2. The apparatus of claim 1, wherein each load mass from the plurality of load masses has substantially the same circumferential dimension, substantially the same axial dimension, and substantially the same radial dimension.

3. The apparatus of claim 1, wherein each load mass from the plurality of load masses is configured to maintain its structural integrity when the flywheel is rotated at the second rotational velocity.

4. The apparatus of claim 1, wherein the plurality of load masses is a first plurality of load masses, the longitudinal segment is a first longitudinal segment, and the radially outwardly directed force is a first radially outwardly directed force, the apparatus further comprising:
   a second plurality of load masses distributed circumferentially around, and coupled to, the inner surface of the flywheel at a second longitudinal segment along the axis of rotation, rotation of the flywheel causing each load mass from the second plurality of load masses to produce a second radially outwardly directed force on the inner surface of the flywheel, the second radially outwardly directed force acting to reduce the maximum through-thickness stress in the matrix material such that the matrix material does not fail in the radial direction along the second longitudinal segment at the second rotational velocity.

5. The apparatus of claim 4, wherein each load mass in the second plurality of load masses is formed of a permanent magnetic material.

6. The apparatus of claim 4, wherein each load mass in the second plurality of load masses is formed of an inert material.

7. The apparatus of claim 4, further comprising:
   a third plurality of load masses distributed circumferentially around, and coupled to, the inner surface of the flywheel at a third longitudinal segment along the axis of rotation, the third plurality of load masses being axially spaced from the second plurality of load masses to define an axial stator gap therebetween having a longitudinal gap length, each load mass from the second plurality of load masses and each load mass from the third plurality of load masses being formed of a permanent magnetic material; and
   a stator having a plurality of conductive windings disposed thereon and having an axial thickness less than the longitudinal gap length, the stator being disposed in operative relationship to the flywheel such that at least a portion of the windings are disposed axially between the second plurality of load masses and the third plurality of load masses in the stator gap such that rotation of the flywheel relative to the stator produces a flow of electrical current in the windings.

8. The apparatus of claim 7, wherein rotation of the flywheel causes each load mass from the third plurality of load masses to produce a third radially outwardly directed force on the inner surface of the flywheel, the third radially outwardly directed force acting to reduce the maximum through-thickness stress in the matrix material such that the matrix material does not fail in the radial direction along the third longitudinal segment at the second rotational velocity.

9. The apparatus of claim 7, wherein each load mass from the first plurality of load masses is disposed within the stator gap and radially between a radial surface of the stator and the inner surface of the flywheel.

10. The apparatus of claim 9, wherein each load mass from the first plurality of load masses has substantially the same radial dimension, the radial dimension of each load mass from the first plurality of load masses is a first radial dimension, and
   each load mass from the second plurality of load masses and the third plurality of load masses has substantially the same radial dimension, the radial dimension of each load mass from the second plurality of load masses and the third plurality of load masses is a second radial dimension greater than the first radial dimension.

11. The apparatus of claim 10, wherein each load mass from the first plurality of load masses has substantially the same density, the density of each load mass from the first plurality of load masses is a first density, and each load mass from the second plurality of load masses and the third plurality of load masses has substantially the same density, the density of each load mass from the second plurality of load masses and the third plurality of load masses is a second density greater than the first density.

12. The apparatus of claim 11, wherein each load mass from the first plurality of load masses, the second plurality of load masses and the third plurality of load masses produces a substantially uniform pressure on the inner surface of the flywheel upon rotation of the flywheel.

13. The apparatus of claim 4, wherein the first radially outwardly directed force is substantially equal to the second radially outwardly directed force.

\* \* \* \* \*